United States Patent [19]
Kitagishi et al.

[11] Patent Number: 4,842,386
[45] Date of Patent: Jun. 27, 1989

[54] VARIABLE FOCAL LENGTH OBJECTIVE

[75] Inventors: Nozomu Kitagishi, Tokyo; Hiroki Nakayama, Kanagawa; Shigeyuki Suda, Tokyo; Jun Hattori, Kanagawa; Akihisa Horiuchi, Tokyo, all of Japan

[73] Assignee: Canon Kabushiki Kaisha, Tokyo, Japan

[21] Appl. No.: 877,102

[22] Filed: Jun. 23, 1986

[30] Foreign Application Priority Data

Jun. 26, 1985 [JP] Japan ............................ 60-139915

[51] Int. Cl.$^4$ .................... G02B 15/00; G02B 15/16; G02B 15/14
[52] U.S. Cl. ................................. 350/427; 350/413; 350/423; 350/426
[58] Field of Search ............... 350/413, 423, 426, 427

[56] References Cited

U.S. PATENT DOCUMENTS

| 4,457,590 | 7/1984 | Moore | 350/413 |
|---|---|---|---|
| 4,571,032 | 2/1986 | Someya et al. | 350/413 |
| 4,730,906 | 3/1988 | Okudaira | 350/413 |

FOREIGN PATENT DOCUMENTS

| 0231517 | 10/1986 | Japan | 350/413 |
|---|---|---|---|
| 0259216 | 11/1986 | Japan | 350/413 |

OTHER PUBLICATIONS

Introduction to Classical and Modern Optics, Jurgen R. Meyer-Arendt, M.D., 1984, Prentice-Hall, Inc. pp. 362-365.
Gradient-index wide-angle Photographic objective design, Atkinson et al., Applied Optics, Jun. 1984, vol. 23, No. 11, pp. 1735-1741.
Design of a gradient-index photographic objective, Atkinson et al, Applied Optics, Mar. 1982, vol. 21, No 6, pp. 993-998.
Camera International, Apr. 1965, No. 4, pp. 36-37.

Primary Examiner—Bruce Y. Arnold
Assistant Examiner—Ronald M. Kachmarik
Attorney, Agent, or Firm—Fitzpatrick, Cella, Harper & Scinto

[57] ABSTRACT

A variable focal length objective having a plurality of lens units with at least one unit separation being varied to vary the focal length of the entire system, in which at least one of the plurality of lens units has at least gradient-index lens having a refractive index distribution of the form: $N(h) = N_0 + N_1 h^2 + N_2 h^4 + N_3 h^6 + \ldots$ where h is the height from the optical axis, $N_0$ is the refractive index on the optical axis, and $N_1, N_2, N_3, \ldots$ are constants, satisfying the following conditions:

$$\phi_G \cdot N_1 < 0$$

$$K \cdot \phi_G \cdot N_2 < 0$$

where $\phi_G$ is the refractive power of that lens unit which has that gradient-index lens, and K is +1 or −1 when the stronger of the curvatures of both surfaces of that gradient-index lens is convex or concave to the air respectively.

4 Claims, 12 Drawing Sheets

FIG.8
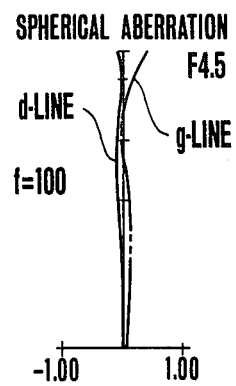 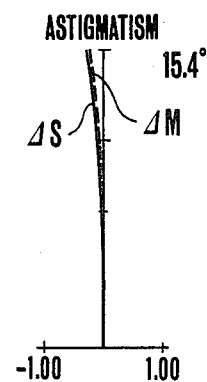 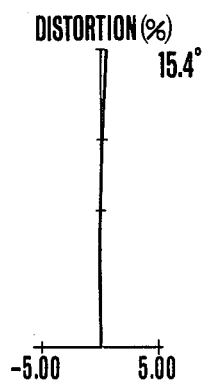
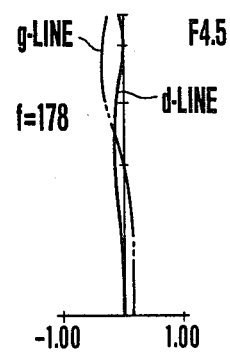 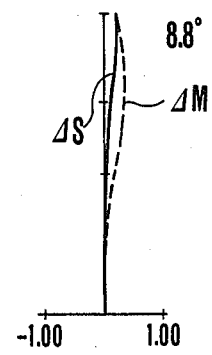 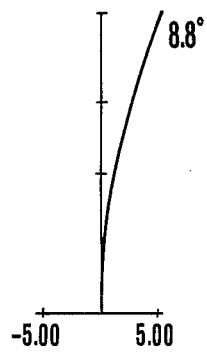
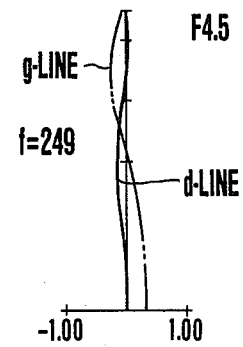 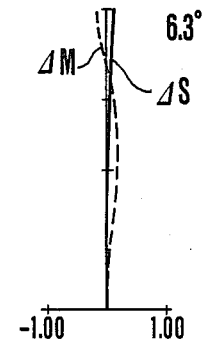 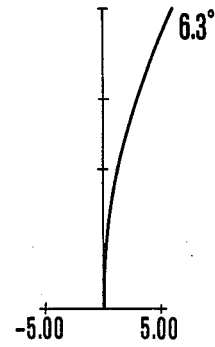

FIG.10
| SPHERICAL ABERRATION | ASTIGMATISM | DISTORTION (%) |
|---|---|---|
| 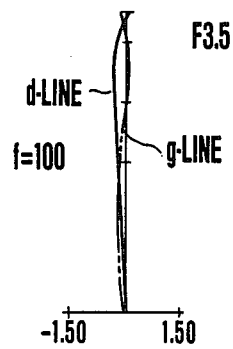 F3.5, f=100, d-LINE, g-LINE | 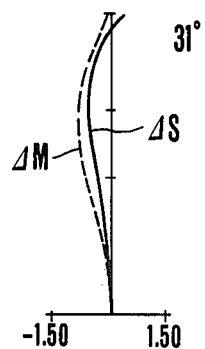 31°, ΔM, ΔS | 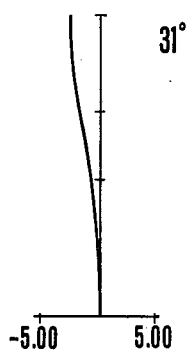 31° |
| 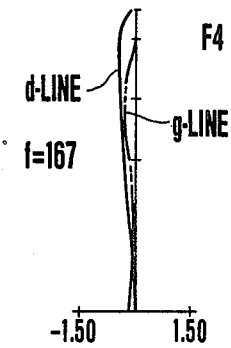 F4, f=167, d-LINE, g-LINE | 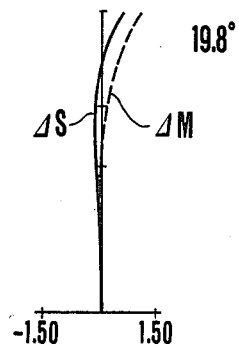 19.8°, ΔS, ΔM | 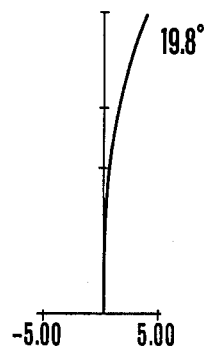 19.8° |
| 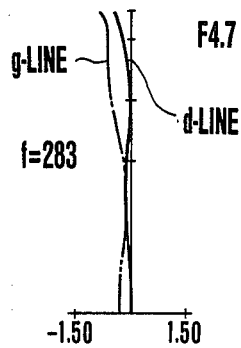 F4.7, f=283, g-LINE, d-LINE | 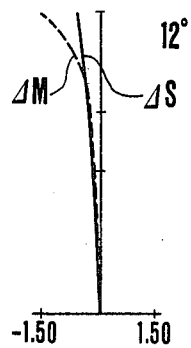 12°, ΔM, ΔS | 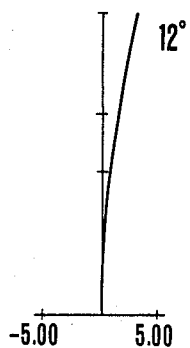 12° |

FIG.12
SPHERICAL ABERRATION
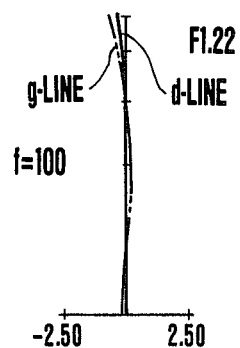
ASTIGMATISM
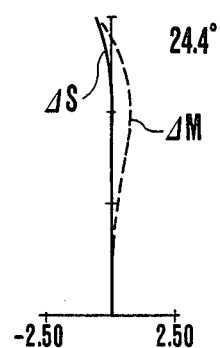
DISTORTION(%)
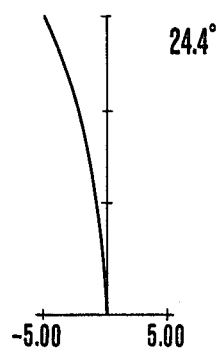
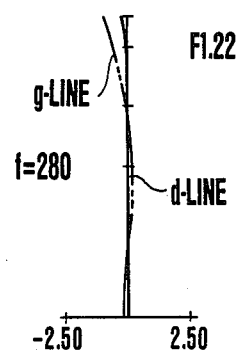
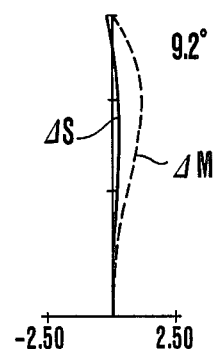
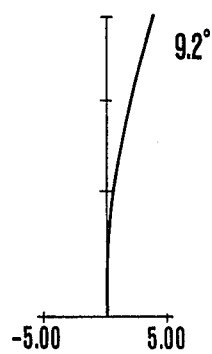
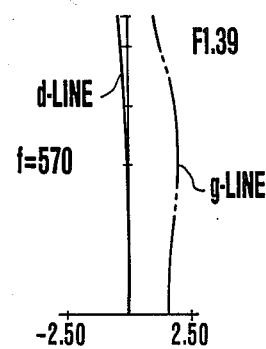
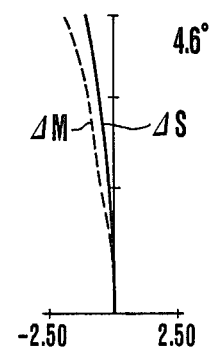
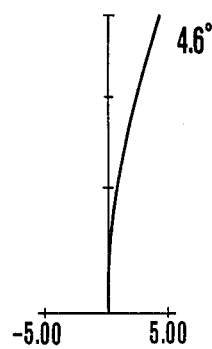

VARIABLE FOCAL LENGTH OBJECTIVE

BACKGROUND OF THE INVENTION

1. Field of the Invention

This invention relates to variable focal length objectives, and more particularly to such objective which has a plurality of lens units with the separation between the first and second lens units being varied to vary the focal length of the entire system.

2. Description of the Related Art

The aberration problem of the variable focal length objective, especially the zoom lens that varies its focal length continuously, must be solved, besides the good correction of aberrations in the standard setting, for as far minimized variation with zooming of the aberrations as possible. To achieve this, all the lens units are required to be at least individually corrected well for spherical aberration, coma and astigmatism in each unit. It has, therefore, been the prior art practice that each lens unit is made up by using several lens elements.

Because the total sum of the lens elements of all the units became enormous, the weight and size of the entire system were very heavy and very long in the longitudinal direction, and the assembly and adjustment of the lens elements in each unit was very difficult to perform with high accuracy in respect to the axial alignment and the spacing.

Recently, much interest has aroused in developing a variable focal length objective of more compact form with an increased range of magnifications. Yet, from the obstacle of the above-described problem of aberration correction it was also very difficult to achieve it by relying on the method of trimming some lenses from each lens unit.

For example, in the type of zoom lens comprising a plurality of lens units of which the first and second counting from the front are respectively positive and negative in power and the separation between the first and second lens units, its bulk and size can be reduced, speaking in the concept of Gauss theory, either by strengthening the power of each lens unit, or by shortening the intervals between the principal points of the successive two of the lens units. As to extend the zooming range, the method of strengthening the power of each lens unit may also be employed. There is another method of increasing the total zooming movement. When the requirements of reducing the size of the zoom lens of the type described above and of increasing the zoom ratio are to be fulfilled simultaneously, it is certainly natural in the concept of Gauss theory to choose the method of increasing the power of each lens unit. In an actual lens system, however, the increase in the power of the lens unit calls for an increase in the number of constituent lens elements in order to achieve good stability of aberration correction over the entire zooming range. This may otherwise be achieved by increasing the power per one lens element with its surface curvatures being strengthened. To allow for the minimum acceptable edge thickness of every lens element, the central thickness of the positive lens and the axial air separation between the adjacent concave surfaces are caused to become very large. In either case, therefore, the physical length of each of the lens units increases. Also since the principal point interval has to be increased, the optical total length of the entire system can no longer be shortened. Such an increase of the length of the lens unit gives rise to another problem that as the space in which the lens unit movable for zooming makes excursion becomes small, a desired increase of the zoom ratio can no longer be achieved.

Further with the first or second lens unit having an increased overall thickness due to the increase of the number of constituent elements, to admit of the oblique pencile, the diameter of the first or front lens unit must be increased. Thus, the attempt to advance the compactness was frustrated. Therefore, the use of any of the prior known methods, because of effecting the result of such a vicious cycle, could not fulfill both requirements of achieving a much-desired reduction of the bulk and size of the zoom lens and of achieving a much desired increase of the zoom ratio while preserving good stability of aberration correction throughout the entire zooming range.

SUMMARY OF THE INVENTION

An object of the present invention is to eliminate the above-described drawbacks of the prior art, and to provide a variable focal length objective of extended range with a lessened total number of lens elements while still permitting good stability of aberration correction to be achieved throughout the zooming range.

BRIEF DESCRIPTION OF THE DRAWINGS

Odd numbered FIGS. 1 to 11 are longitudinal section views of six examples of specific zoom lenses of the invention.

Even numbered FIGS. 2 to 12 are graphic representations of the aberrations of the first to the sixth lenses respectively.

DETAILED DESCRIPTION OF THE PREFERRED EMBODIMENTS

Figure 1:
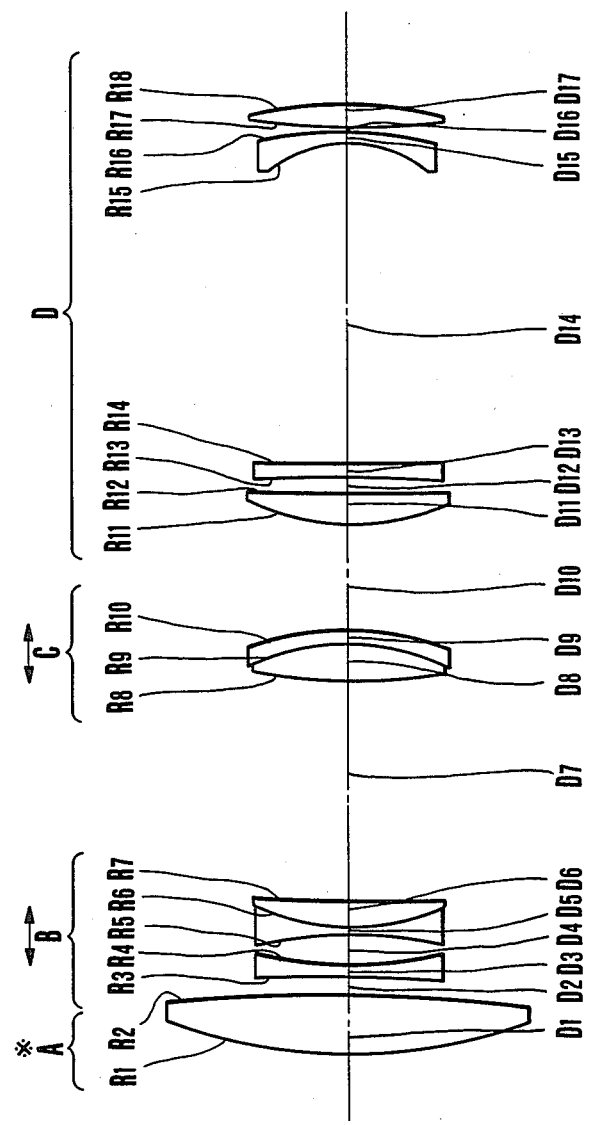

The present invention is applied to the variable focal length objective comprising a plurality of lens units of which the first and second counting from front are a positive lens unit and a negative lens unit respectively, and in which when varying the image magnification, the air separation between the first and second lens units is varied. A feature of the invention in such objective is that at least one of the plurality of lens units is included with at least one gradient-index lens having a refractive index distribution over the radius given by the expression:

$$N(h) = N_0 + N_1 h^2 + N_2 h^4 + N_3 h^6 + \tag{1}$$

where h is the radial distance from the optical axis, $N_0$ is the refractive index on the optical axis, and $N_1$, $N_2$, $N_3$, ... are constants, and is made with a refractive power $\phi_G$ satisfying the following conditions:

$$\phi_G \cdot N_1 < 0 \tag{2}$$

$$K \cdot \phi_G \cdot N_2 < 0 \tag{3}$$

where K is the coefficient representing the sign-convention for the one of the surfaces of the gradient-index lens which has a stronger curvature than the other, in which when that surface is convex, $K = +1$, and, for the concave surface, $K = -1$.

As is understandable from the equation (1), the gradient-index lens herein used has a distribution of refractive indices along the radial direction of the lens, or so-called radial gradient of refractive index. Particularly when such a gradient-index lens is introduced to that lens unit which contributes to variation of the image magnification, or, in the usual zoom lens concept, the variator, or to that lens unit which contributes to compensate for the image shift, or, in the usual zoom lens concept, the compensator, it becomes possible to realize a variable focal length objective in which the bulk and size and weight are reduced in such a manner that a good stability of aberration correction over the extended range of variation of the focal length is achieved.

The radial gradient-index lens differs from the ordinary lens of homogeneous material in that its interior has a converging action (hereinafter referred to as "positive transition of power"), or a diverging action (hereinafter referred to as "negative transition of power"). Further since a refractive index pattern appears from the lens surface, the refracting action of that surface on the rays of light also becomes different from that of the usual lens.

Here, if, as the inequality (2) is to be satisfied, the aforesaid gradient-index lens is given such a refractive index distribution that $\phi_G \cdot N_1 < 0$ results, it exerts a surplus power of $\phi = -2N_1 D$ owing to the gradient of refractive index, where D is the axial thickness of the lens. This implies that the medium of the gradient-index lens shares the required power of that lens unit which contains that gradient-index lens by the amount $\phi$. Therefore, the curvatures of each of the lenses constituting that lens unit can be weakened with an advantage of reducing the aberrations.

When the inequality (3) or $K \cdot \phi_G \cdot N_2 < 0$ is satisfied simultaneously, the refracting action at the surface of the gradient-index lens in cooperation with the above-described power of the gradient permits a higher degree of aberration correction to be obtained.

The rules of design of the invention are next discussed based on the aberration theory in detail below.

Whilst P. J. Sands et al. have derived the third order aberration coefficients for the gradient-index lens, the terminology in "Lens Design Method" by Yoshiya Matsui (published from Kyoritsu Shuppan Co. 1962) is used here for defining the third-order aberration coefficients by the following formulae (4) to (18). For note, the aberration coefficients of the gradient-index lens are grouped to three sets of terms: (A) the terms of refraction arising when it is assumed to be a sphare of homogeneous medium are exposed by the formulae (4) to (8); (B) the terms of refraction due to the refractive index distribution over the surface of the gradient-index lens are exposed by the formulae (9) to (13); and (C) the terms of aberrations ascribable to the power of gradient of the medium of the gradient-index lens (hereinafter referred to as the "terms of gradient") are expressed by the formulae (14) to (18).

$$(A): I_\nu = h_\nu^4 Q_\nu^2 \Delta\left(\frac{1}{Ns}\right) \tag{4}$$

$$II_\nu = h_\nu^3 \bar{h}_\nu Q_\nu \bar{Q}_\nu \Delta_\nu\left(\frac{1}{Ns}\right) \tag{5}$$

$$III_\nu = h_\nu^2 \bar{h}_\nu^2 \bar{Q}_\nu^2 \Delta_\nu\left(\frac{1}{Ns}\right) \tag{6}$$

$$IV_\nu = III_\nu + P_\nu \; ; \; P_\nu = \frac{\phi_\nu}{N_\nu \; N_\nu'} \tag{7}$$

$$V_\nu = h_\nu \bar{h}_\nu^3 \bar{Q}_\nu^2 \Delta_\nu\left(\frac{1}{Ns}\right) + \bar{h}_\nu^2 \bar{Q}_\nu \Delta_\nu\left(\frac{1}{Nt}\right) \tag{8}$$

$$(B): I_\nu = h_\nu^4 \Psi_{in,\nu} \tag{9}$$

$$II_\nu = h_\nu^3 \bar{h}_\nu \Psi_{in,\nu} \tag{10}$$

$$III_\nu = \bar{h}_\nu^2 \bar{h}_\nu \Psi_{in,\nu} \tag{11}$$

$$IV_\nu = III_\nu + P_\nu \tag{12}$$

$$V = h_\nu \bar{h}_\nu^3 \Psi_{in,\nu} \tag{13}$$

where $$\Psi_{in,\nu} = \frac{4}{r_\nu}(\Delta N_{1\nu}) + \frac{1}{r_\nu^2}\left(\Delta \frac{dN_{0\nu}}{dx}\right)$$

$$(C): I_\nu^t = V_\nu\left(\frac{h\alpha^3}{N_0^2}\right) - \tag{14}$$

$$\int_{\nu \to \nu + 1} \left[8 N_2 h^4 + \frac{4N_1 h^2 \alpha^2}{N_0^2} - \frac{\alpha^4}{N_0^3}\right] dx$$

$$II_\nu^t = V_\nu\left(\frac{h\alpha^2 \bar{\alpha}}{N_0^2}\right) - \tag{15}$$

$$\int_{\nu \to \nu + 1} \left[8 N_2 h^3 \bar{h} + \frac{2N_1 h\alpha}{N_0^2}(h\bar{\alpha} + \bar{h}\alpha) - \frac{\alpha^3 \bar{\alpha}}{N_0^3}\right] dx$$

$$III_\nu^t = V_\nu\left(\frac{h\alpha \bar{\alpha}^2}{N_0^2}\right) - \tag{16}$$

$$\int_{\nu \to \nu + 1} \left[8 N_2 h^2 \bar{h}^2 + \frac{4N_1 h \bar{h} \alpha \bar{\alpha}}{N_0^2} - \frac{\alpha^2 \bar{\alpha}^2}{N_0^3}\right] dx$$

$$IV_\nu^t = III_\nu^t + P_\nu^t \; ; \; P_\nu^t = -2 \int_{\nu \to \nu + 1} (N_1/N_0^2) dx \tag{17}$$

$$V_\nu^t = V_\nu \frac{h\bar{\alpha}^3}{N_0^2} - \tag{18}$$

$$\int_{\nu \to \nu + 1} \left[8 N_2 h \bar{h}^3 = \frac{2 N_1 \bar{h} \bar{\alpha}}{N_0^2}(h\bar{\alpha} + \bar{h}\alpha) - \frac{\alpha \bar{\alpha}^3}{N_0^3}\right] dx$$

Taking an example of spherical aberration, in what way it is corrected is explained below. Since the gradient-index lens adopted in the invention is of the radial type, $\Psi_{in,\nu}$ in the terms for refraction due to the refractive index distribution, or the formulae (9) to (13) reduces to $$\Psi_{in,\nu} = 4(\Delta N_1 \nu)/r\nu \tag{19}$$

It follows from (9) and (19) that, for, as the medium surrounding the front or rear surface of the gradient-index lens is homogeneous, the distribution coefficient $N_1$ in the equation (1) is of negative sign, when the surface of stronger curvature is convex, $\Psi_{in,\nu} < 0$ (hereinafter the suffix $\nu$ will be omitted), so that the value of $h^4 \Psi_{in}$ in the formula (9) is negative. Hence the spherical aberration is produced in direction to over-correction. When that surface is concave, $\Psi_{in} > 0$, so that $h^4 \Psi_{in}$ has a positive value. Hence the spherical aberration is produced in direction to under-correction. For the distribution coefficient $N_1$ is of positive sign, on the other hand, when that surface is convex, $\Psi_{in}<0$, so that the value of $h^4\Psi_{in}$ is positive. Hence the spherical aberration is produced in direction to under-correction. When that surface is concave, $\Psi_{in}<0$, so that the value $h^4\Psi_{in}$ is negative. Hence the spherical aberration is produced in direction to over-correction. In summary, depending on whether the sign of the power of that lens unit which is selected for incorporation of the gradient-index lens is positive or negative, and, because the sign of the distribution coefficient $N_1$ is determined according to the above-stated inequality (2), depending on whether that surface of the gradient-index lens whose curvature is stronger than the other is convex or concave, which correction of spherical aberration that surface gives can be discriminated by finding the sign of the coefficient for spherical aberration as shown in the following table.

| Lens Unit | Equation (1) | Spherical Aberration Gradient-Index Lens | |
|---|---|---|---|
| | | Convex (K = +1) | Concave (K = −1) |
| $\phi_G > 0$ | $N_1 < 0$ | $h^4\Psi_{in} < 0$ | $h^4\Psi_{in} > 0$ |
| $\phi_G < 0$ | $N_1 > 0$ | $h^4\Psi_{in} > 0$ | $h^4\Psi_{in} < 0$ |

Next, the term of the gradient for spherical aberration given by the expression of the equation (14) is of the very complicated form including terms of integrations. But, in the case of the radial type of gradient-index lens, $N_0$, $N_1$ and $N_2$ when to integrate with respect to X or the axial direction can be treated as constants. Further, on assumption that the ray of light travelling in interior of the gradient-index lens does not largely change its height h or $\bar{h}$, the equation (14) can be simplified to and approximated by $$It \approx \frac{h}{N_0^2} \nabla(\alpha^3) - 8N_2 h^4 D - \frac{4N_1 h^2}{N_0} \int \alpha^2 \, dx + \frac{1}{N_0^3} \int \alpha^4 \, dx \quad (20)$$

Of the four terms of the equation (20) it is in the usual zoom lens that the second one gives a largest contribution to spherical aberration, and is, therefore, predominant. For this reason, the term of gradient for the spherical aberration of the gradient-index lens has an important parameter as a function of the value of the distribution coefficient $N_2$ of the equation (1).

In other words, by choosing an appropriate value of the distrubution coefficient $N_2$, the term of gradient for the spherical aberration can be controlled. For example, when $N_2>0$, the spherical aberration is produced in direction to over-correction. For $N_2<0$, the spherical aberration is produced in direction to under-correction.

The present invention sets forth the conditions under which the third-order aberrations of the gradient-index lens in terms of refraction and gradient of the above-described refractive index distribution cancel out each other for a higher degree of correction. The simple expression of these conditions is of the above-described form of the inequalities (2) and (3). The combination of these inequalities (2) and (3) means that the direction of production of the aberrations ascribable to the refractive index pattern on that surface of the gradient-index lens which has a stronger curvature than the other has is made opposite to the direction of production of the aberrations ascribable to the gradient of refractive index. For example, in the case of spherical aberration, with the lens unit containing the gradient-index lens when being of positive power $\phi_G>0$, the inequality (2) determines $N_1<0$. If the surface of stronger curvature of the gradient-index lens is convex (K = +1), the term of refraction for spherical aberration is $h^4\Psi_{in}<0$. As it then follows that the term of gradient for spherical aberration should be $I^t>0$, the value of $N_2$ is determined to be $N_2<0$, according to the inequality (3). If that surface is concave (K = −1), after the same reasoning, the opposite sign for $N_2$ should be chosen. Conversely when the lens unit is of negative power: $\phi_G<0$, the sign for $N_1$ should be changed to $N_1>0$ according to the inequality (2). If that surface is convex (K = +1), $h^4\Psi_{in}>0$. Then, the inequality (3) determines $N_2>0$ so that the term of gradient for spherical aberration becomes $I^t<0$. If that surface is concave (K = −1), the sign for $N_2$ should be changed to $N_2<0$ according to the inequality (3).

As has been described above, in the present invention, the choosing of which sign to determine the coefficients $N_1$ and $N_2$ of the equation for the refractive index distribution of the gradient-index lens is made controlled in accordance with the critical conditions set forth above, when a higher degree of aberration correction is obtained. It is to be noted that what is referred to by the term radial type gradient-index lens in the invention must be taken that the radial gradient of refractive index is dominant on the performance of the lens itself. Therefore, regardless of the inclusion of another or longitudinal gradient of refractive index, if its effect is far weaker than that of the radial type, it should be understood that it falls within the scope and spirit of the invention.

The invention will next be described in connection with specific embodiments thereof in great detail.

Figure 2:
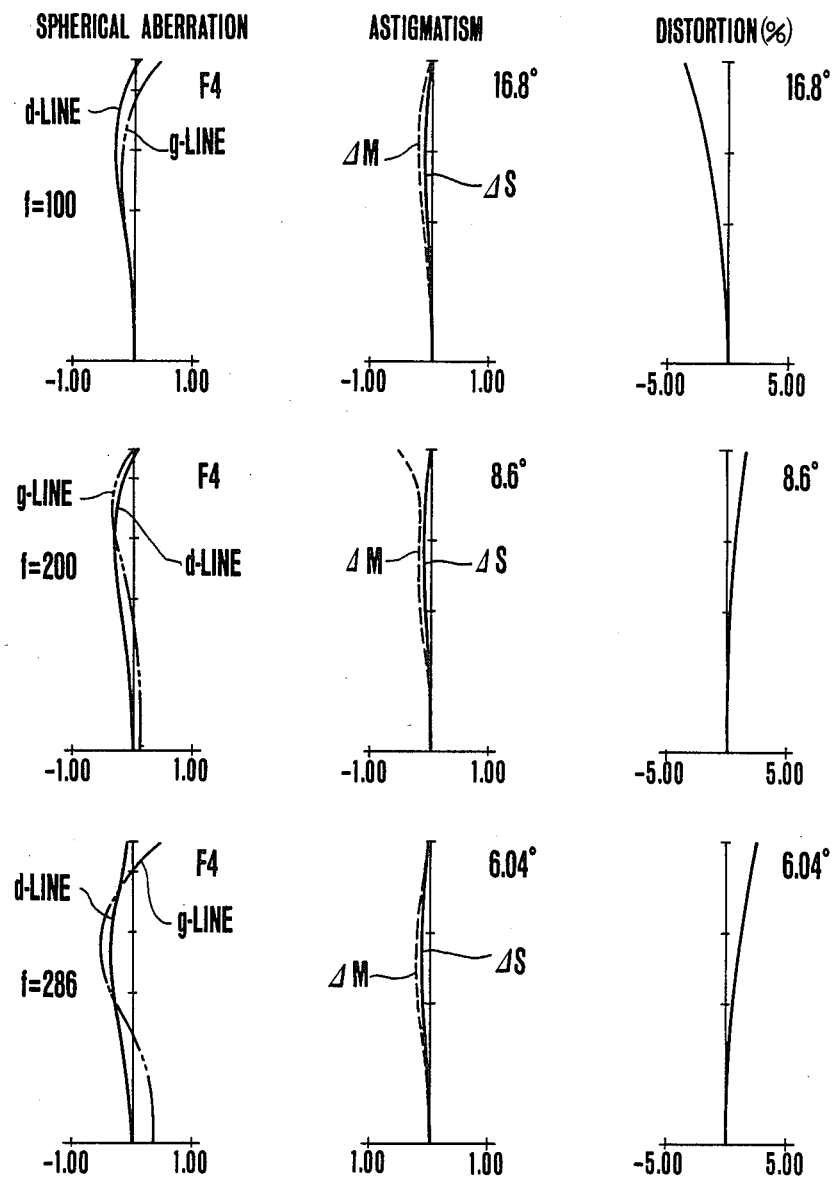

FIG. 1 in longitudinal section view illustrates the construction and arrangement of the elements of an example of a specific zoom lens according to the present invention, and FIG. 2 shows its aberrations. The zoom lens comprises, from front to rear, a first lens unit A, a second lens unit B, a third lens unit C and a fourth lens unit D with the surfaces denoted by Ri (i=1, 2, 3, ...) for the i-th surface counting from front, and the axial thicknesses or air separations denoted by Di (i=1, 2, 3, ...) for the one between the i-th and (i+1)th surfaces. The spherical aberrations d and g for spectral d- and g-lines respectively, the astigmatisms M and S in the meridional and sagittal planes respectively, and the distortion of the lens of FIG. 1 are shown in different zooming positions of f=100, 200 and 286 mm.

The first lens unit A is of positive power and is held stationary during zooming. The second lens unit B is of negative power and axially moves with zooming to contribute to variation of the image magnification, and the third lens unit C is of positive power and also axially moves with zooming to compensate for the image shift. The fourth lens unit D of positive power remains stationary during zooming. The positive first lens unit A is constructed in the form of a singlet defined by surfaces $R_1$ and $R_2$ and having a radial gradient of refractive index defined by the equation (1) where the coefficients $N_1$ and $N_2$ take the signs: $N_1<0$, and $N_2<0$.

The above-defined gradient-index lens, unlike the usual lens of homogeneous medium, gives a converging function at the medium as it has a positive transition of power. Letting the overall power and thickness of the gradient-index lens A be denoted by $\phi_I$ and D respectively, since the gradient of refractive index is made of $N_1 < 0$ according to the inequality of condition (2) or $\phi_I \cdot N_1 < 0$, because the power $\phi$ in terms of the gradient of the gradient-index lens A then takes a value of $\phi = -2N_1D$, the positive power assigned to the first lens unit A is shared by the medium of the gradient-index lens with its refracting surfaces. In the zoom lens of FIG. 1, due to the weakened curvatures of both surfaces of one lens constituting the positive first lens unit A, the aberrations are, therefore, primarily reduced remarkably.

The use of the convex form in the positive first lens unit in combination with such a gradient of refractive index as to give a positive transition of power as in this zoom lens is advantageous at correcting spherical aberrations in the telephoto positions. Other aberrations, for example, coma and astigmatism, can be also well corrected. Thus, it is made possible that only one gradient-index lens suffices for making up the positive first lens unit A.

In more detail, since the front and rear surfaces of the positive first lens unit A or the gradient-index lens are both convex, and the coefficient $N_1$ is of negative sign, the third-order spherical aberration in terms of refraction in the telephoto positions is largely over-corrected. Further since, as $K = +1$, the sign of the coefficient $N_2$ is made negative according to the inequality of condition (3), the spherical aberration in terms of gradient is under-corrected. Thus, a possibility of achieving a good balance is provided. In such a manner, by controlling the values of the terms of refraction and gradient for the third-order aberrations, not only the spherical aberration but also coma and astigmatism can be corrected as well.

The numerical data in accordance with which the zoom lens of FIG. 1 can be constructed are given in Tables 1-1 to 1-3 for the focal length f of the entire system, F-number FNO, the image angle 2ω, the radii of curvature, R, the axial thicknesses or air separations, D, and the refractive indices, N, and Abbe numbers, ν, of the glasses of the lens elements with the subscripts numbered consecutively from front to rear, along with the values for the spectral d- and g-lines of the refractive index distribution coefficients $N_0$ to $N_4$.

TABLE 1-1

| f = 100–286 mm    FNO = 4    2ω = 33.7°–12.1° | | | |
|---|---|---|---|
| Radius of curvature | Axial thickness or air separation | Refractive index | Abbe number |
| R 1 = 113.846 | D 1 = 12.65 | N 1 = N 1 (h) | ν 1 = |
| R 2 = −297.528 | D 2 = Variable | | |
| R 3 = −304.656 | D 3 = 2.09 | N 2 = 1.71300 | ν 2 = 53.8 |
| R 4 = 68.065 | D 4 = 6.50 | | |
| R 5 = −95.975 | D 5 = 2.09 | N 3 = 1.72000 | ν 3 = 50.2 |
| R 6 = 49.300 | D 6 = 4.73 | N 4 = 1.84666 | ν 4 = 23.9 |
| R 7 = 329.983 | D 7 = Variable | | |
| R 8 = 140.022 | D 8 = 8.08 | N 5 = 1.50977 | ν 5 = 62.1 |
| R 9 = −44.591 | D 9 = 2.09 | N 6 = 1.75520 | ν 6 = 27.5 |
| R 10 = −79.152 | D 10 = Variable | | |
| R 11 = 50.796 | D 11 = 6.27 | N 7 = 1.61272 | ν 7 = 58.7 |

TABLE 1-1-continued

| f = 100–286 mm    FNO = 4    2ω = 33.7°–12.1° | | | |
|---|---|---|---|
| Radius of curvature | Axial thickness or air separation | Refractive index | Abbe number |
| R 12 = 1452.507 | D 12 = 3.40 | | |
| R 13 = −297.076 | D 13 = 2.78 | N 8 = 1.80518 | ν 8 = 25.4 |
| R 14 = 748.143 | D 14 = 65.71 | | |
| R 15 = −27.591 | D 15 = 2.78 | N 9 = 1.80610 | ν 9 = 40.9 |
| R 16 = −61.394 | D 16 = 0.28 | | |
| R 17 = 256.247 | D 17 = 5.01 | N 10 = 1.59551 | ν 10 = 39.2 |
| R 18 = −75.128 | | | |

TABLE 1-2

| | f | | |
|---|---|---|---|
| Di | 100 | 200 | 286 |
| D 2 | 3.5538 | 48.6550 | 62.2338 |
| D 7 | 46.7806 | 21.9370 | 0.5503 |
| D 10 | 24.5758 | 4.3182 | 12.1261 |

TABLE 1-3

| Ni (h) | λ | $N_0$ | $N_1$ | $N_2$ | $N_3$ | $N_4$ |
|---|---|---|---|---|---|---|
| N1 (h) | d | 1.53113 | $-1.00768 \times 10^{-5}$ | $-4.05391 \times 10^{-10}$ | $3.24621 \times 10^{-13}$ | $6.74961 \times 10^{-18}$ |
| | g | 1.54160 | $-5.10666 \times 10^{-6}$ | $2.91498 \times 10^{-9}$ | $-1.87763 \times 10^{-12}$ | $4.16037 \times 10^{-15}$ |

Figure 3:
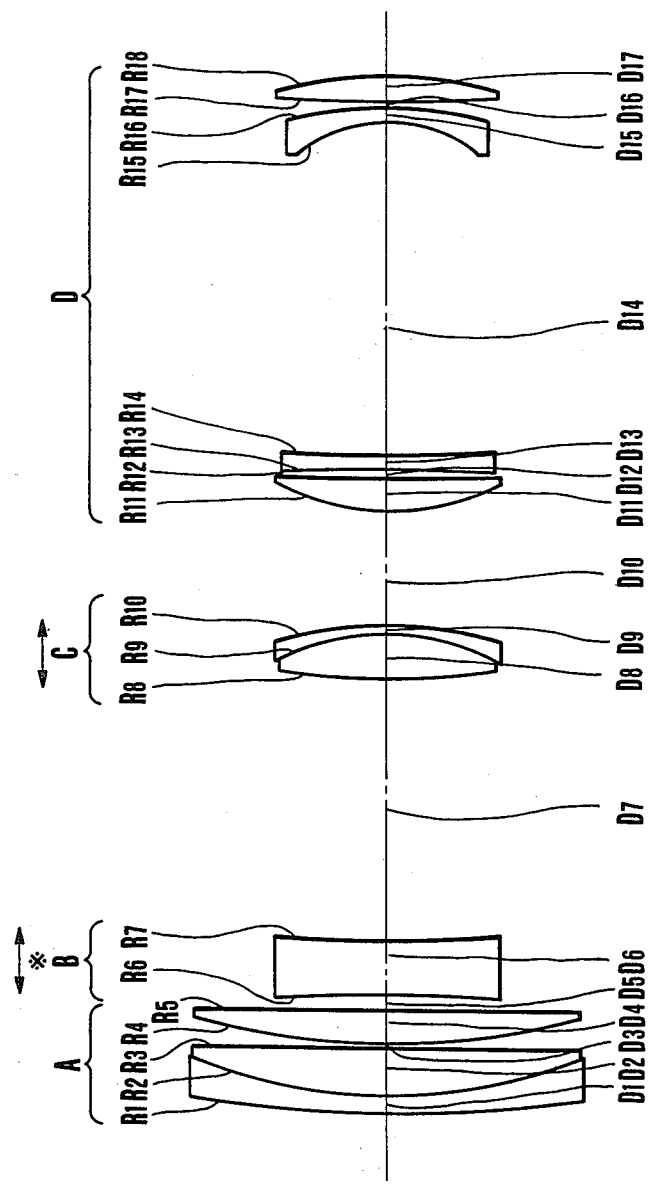
Figure 4:
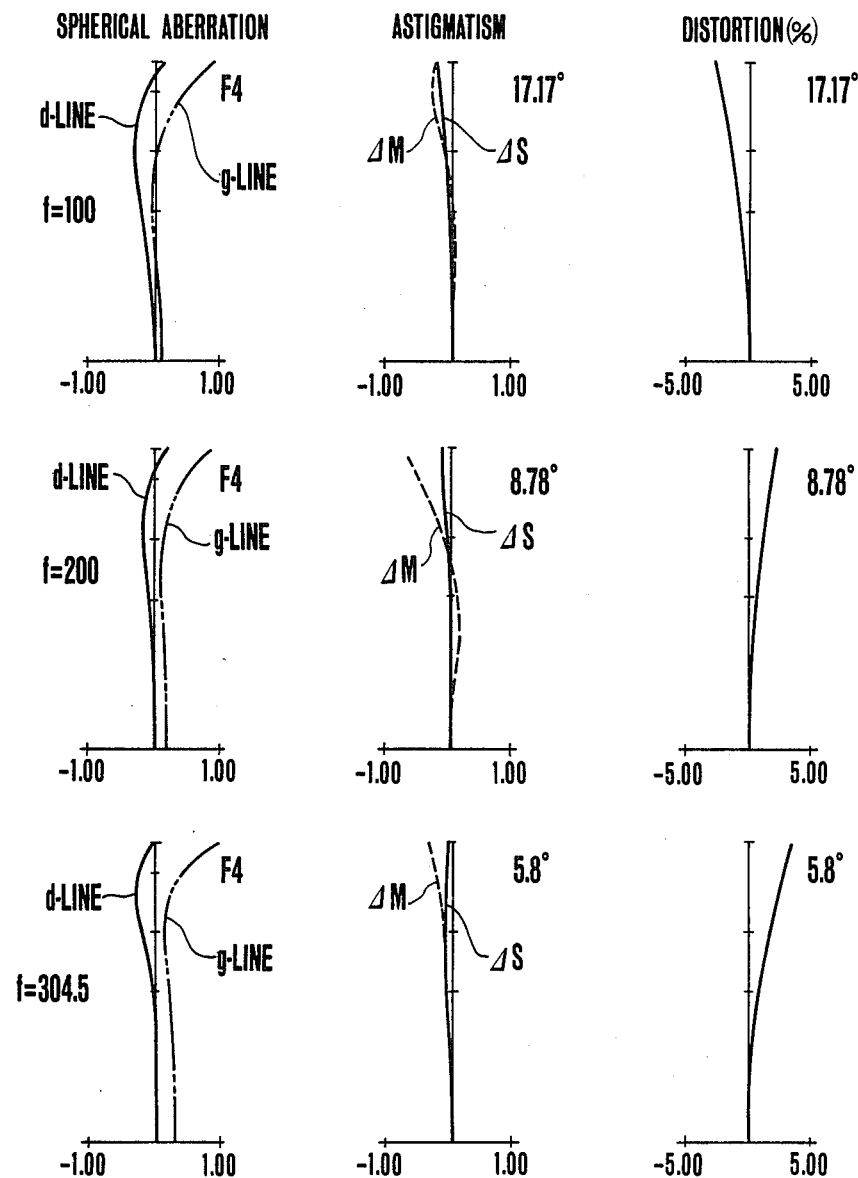

FIG. 3 illustrates another specific zoom lens of the invention whose aberrations are shown in FIG. 4. The symbols in these figures have the same meanings as those in FIGS. 1 and 2. The aberration curves represent the spherical aberration, astigmatism and distortion in different zooming positions of the focal length f = 100, 200 and 304.5 mm.

The zoom lens comprises, from front to rear, a positive first lens unit A which is held stationary during zooming, a negative second lens unit B which axially moves with zooming to contribute to variation of the image magnification, a positive third lens unit C which axially moves with zooming to compensate for the image shift, and a positive fourth lens unit D which remains stationary during zooming. The second lens unit B, usually called the variator, is constructed with a gradient-index lens of the radial type with the surfaces $R_6$ and $R_7$. The gradient-index lens is made of a gradient of refractive index defined by the equation (1) where the coefficients $N_1$ and $N_2$ are of opposite sign such that $N_1 > 0$, and $N_2 < 0$.

The above-defined gradient-index lens, unlike the usual lens of homogeneous medium, gives a diverging function at its medium, and has a negative transition of power. Letting $\phi_{II}$ denote the required power of the negative second lens unit B and D the thickness of the gradient-index lens, it follows from the inequality of condition (2) that as $\phi_{II} \cdot N_1 < 0$, the gradient-index lens should be made with a gradient of refractive index of $N_1 > 0$. Then, the power $\phi$ owing to the term of gradient of the gradient-index lens is $\phi = -2N_1D$. This implies that the negative power of the lens unit B is partly borne by the term of gradient of the gradient-index lens. In this zoom lens, the negative second lens unit B can be constructed with one lens whose surfaces both are weak in curvature. Therefore, the zoom lens is fundamentally corrected to minimums of aberrations produced.

When the second lens unit B is constructed in the form of a bi-concave lens having a gradient of refractive index for the negative transition of power, the spherical aberration in the telephoto positions can be advantageously corrected. And, other various aberrations, for example, coma and astigmatism, can also be corrected well. This permits only one gradient-index lens to suffice for constituting the negative second lens unit.

Both surfaces of the aforesaid gradient-index lens of the negative second lens unit B are concave, and the coefficient $N_1$ in the equation for the gradient of refractive index is made $N_1>0$, so that the third-order spherical aberration in terms of refraction at the concave surface is largely over-corrected in the telephoto positions. Since both surfaces of the gradient-index lens of the negative second lens unit B are concave, because $K=-1$, the gradient of refractive index is made with $N_2<0$, according to the inequality of condition (3), thereby the spherical aberration in terms of the gradient is produced in the opposite direction to that in which the spherical aberration in terms of the refraction is produced. Thus, a possibility of taking a balance is provided.

In such a manner the spherical aberration can be corrected by controlling the terms of the gradient and refraction for the third-order aberration. Similarly the coma and astisgmatism can be corrected.

Whilst it has been usual in the prior art that the negative second lens unit B is constructed by using three lens elements and that the spherical aberration is corrected by the cemented surface of the cemented lens, it is in the zoom lens of the invention that despite the negative second lens unit B is constructed by using only one lens element, the spherical aberration can be well corrected.

Further, the Petzval sum can be corrected when the gradient-index lens of the negative second lens unit B is made of the gradient of refractive index that satisfies the inequality of condition (2), or the gradient of refractive index of $N_1>0$ as in the zoom lens of FIG. 3. Letting $\phi$ denote the power owing to the converging or diverging effect of the medium of the gradient-index lens referred to the normalized focal length of the entire system to unity, and $N_0$ the basic refractive index, the Petzval sum varies as a function of $P=\phi/N_2^0$, being inversely proportional to the square of $N_0$, while the Petzval sum of the spherical system produces a larger Petzval sum, because the latter is expressed by $P=\phi/N_0$. Therefore, in the case of the zoom lens of the invention, a smaller Petzval sum is produced in the negative sense. On assumption that the power arrangement is the same as that of the zoom lens of the invention, the variator of the spherical system produces a Petzval sum of $-1.25$ to $1.3$ in contrast to the negative second lens unit B as the variator of FIG. 3 which has a Petzval sum of $-1.025$ from the reason described above.

This means that the power of the zoom section may be strengthened or the telephoto ratio of the relay section may be reduced in order to shorten the optical total length of the entire system as compared with the spherical system. That is, the largest drawback of the conventional method for shortening the total length by strengthening the power of the zoom section, or by reducing the telephoto ratio of the relay section was that the Petzval sum became too large in the negative sense to be corrected. In the zoom lens of the invention, however, the variator produces a smaller Petzval sum in the negative sense, thus increasing the possibility of shortening the optical total length of the entire system by the above-described method.

In the zoom lens of the invention, the telephoto ratio of the relay section comprised of the positive fourth lens unit D is reduced so that the ratio of the total length of the entire system of 254.8 mm to the longest focal length of the entire ratio, or the telephoto ratio of the entire system can be reduced to a very small value of 0.836. Further, by the room for freedom created in the Petzval sum, the power of the positive first lens of the surfaces $R_{11}$ and $R_{12}$ in the positive fourth lens unit D is made higher to permit a higher degree of spherical aberration correction to be achieved.

Usually the variator of the zoom lens is constructed with three to five lens elements of strong power, and the tolerances for the thicknesses of the lens elements, the air spacings and the decentering of the lens elements from the common axis must be very rigorous. But, now that it can be constructed with only one element as in the zoom lens of the invention, the assembly and the adjusting operation becomes extremely easy.

The numerical data of the zoom lens of FIG. 3 along with the separations between the lens units during zooming, and the values of the coefficients for the gradient-index lens ar given in Tables 2-1 to 2-3 below. For note, the symbols in the tables have the same meanings as those stated in connection with the first example.

TABLE 2-1

$f = 100-304.5$ mm  FNO $= 4$  $2\omega = 33.34°-11.6°$

| Radius of curvature | Axial thickness or air separation | Refractive index | Abbe number |
|---|---|---|---|
| R 1 = 210.378 | D 1 = 3.90 | N 1 = 1.80518 | $\nu$ 1 = 25.4 |
| R 2 = 95.402 | D 2 = 9.40 | N 2 = 1.61272 | $\nu$ 2 = 58.7 |
| R 3 = −4243.836 | D 3 = 0.14 | | |
| R 4 = 135.346 | D 4 = 6.68 | N 3 = 1.61272 | $\nu$ 3 = 58.7 |
| R 5 = −2643.187 | D 5 = Variable | | |
| R 6 = −279.005 | D 6 = 10.53 | N 4 = N4 (h) | |
| R 7 = 258.188 | D 7 = Variable | | |
| R 8 = 133.470 | D 8 = 8.08 | N 5 = 1.51633 | $\nu$ 5 = 64.1 |
| R 9 = −46.653 | D 9 = 2.09 | N 6 = 1.75520 | $\nu$ 6 = 27.5 |
| R 10 = −84.501 | D 10 = Variable | | |
| R 11 = 49.541 | D 11 = 6.27 | N 7 = 1.71300 | $\nu$ 7 = 55.2 |
| R 12 = 1079.685 | D 12 = 1.11 | | |
| R 13 = −380.726 | D 13 = 2.78 | N 8 = 1.80518 | $\nu$ 8 = 25.4 |
| R 14 = 271.435 | D 14 = 64.41 | | |
| R 15 = −25.406 | D 15 = 2.78 | N 9 = 1.76200 | $\nu$ 9 = 40.1 |
| R 16 = −72.472 | D 16 = 0.28 | | |
| R 17 = 227.126 | D 17 = 5.01 | N 10 = 1.59551 | $\nu$ 10 = 30.5 |
| R 18 = −75.129 | | | |

TABLE 2-2

| Di | f | | |
|---|---|---|---|
| | 100 | 200 | 304.5 |
| D 5 | 2.7787 | 47.8801 | 63.3781 |
| D 7 | 51.0469 | 26.2032 | 0.2132 |
| D 10 | 23.2531 | 2.9954 | 13.4873 |

TABLE 2-3

| Ni (h) | $\lambda$ | $N_0$ | $N_1$ | $N_2$ | $N_3$ |
|---|---|---|---|---|---|
| N 4 (h) | d | 1.47069 | $8.0759 \times 10^{-4}$ | $-3.1382 \times 10^{-7}$ | $8.9457 \times 10^{-11}$ |
| | g | 1.47925 | $8.0465 \times 10^{-4}$ | $-3.1744 \times 10^{-7}$ | $9.5646 \times 10^{-11}$ |

Figure 5:
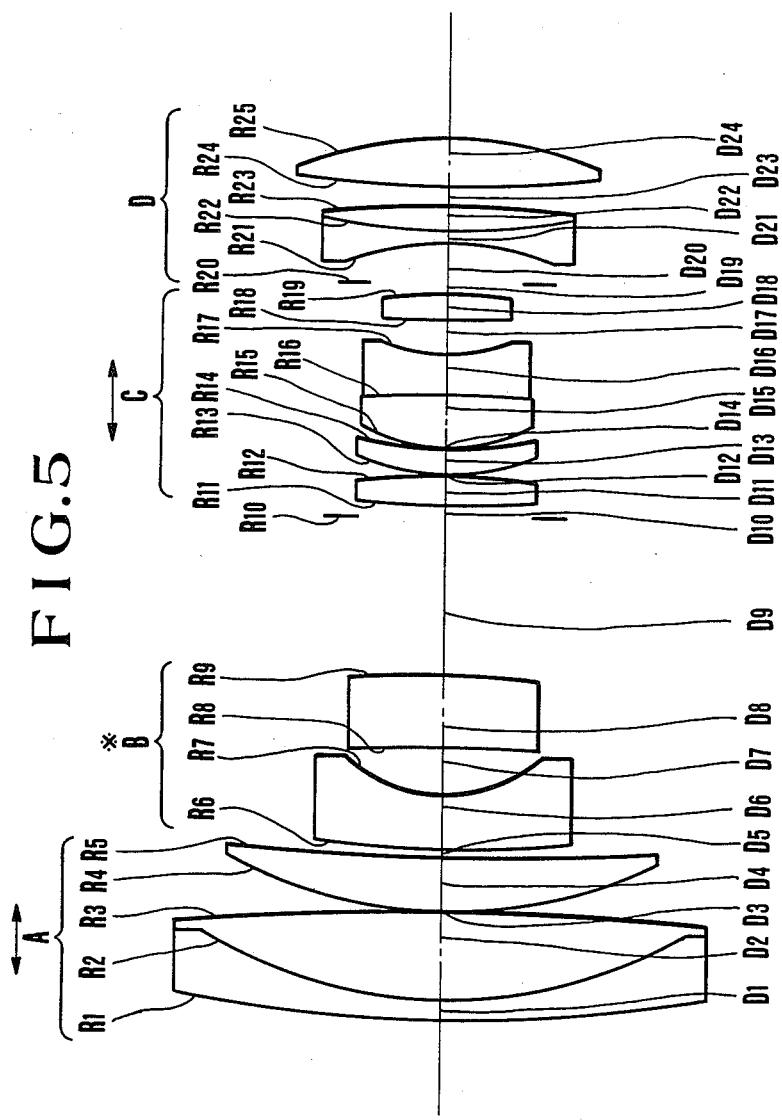
Figure 6:
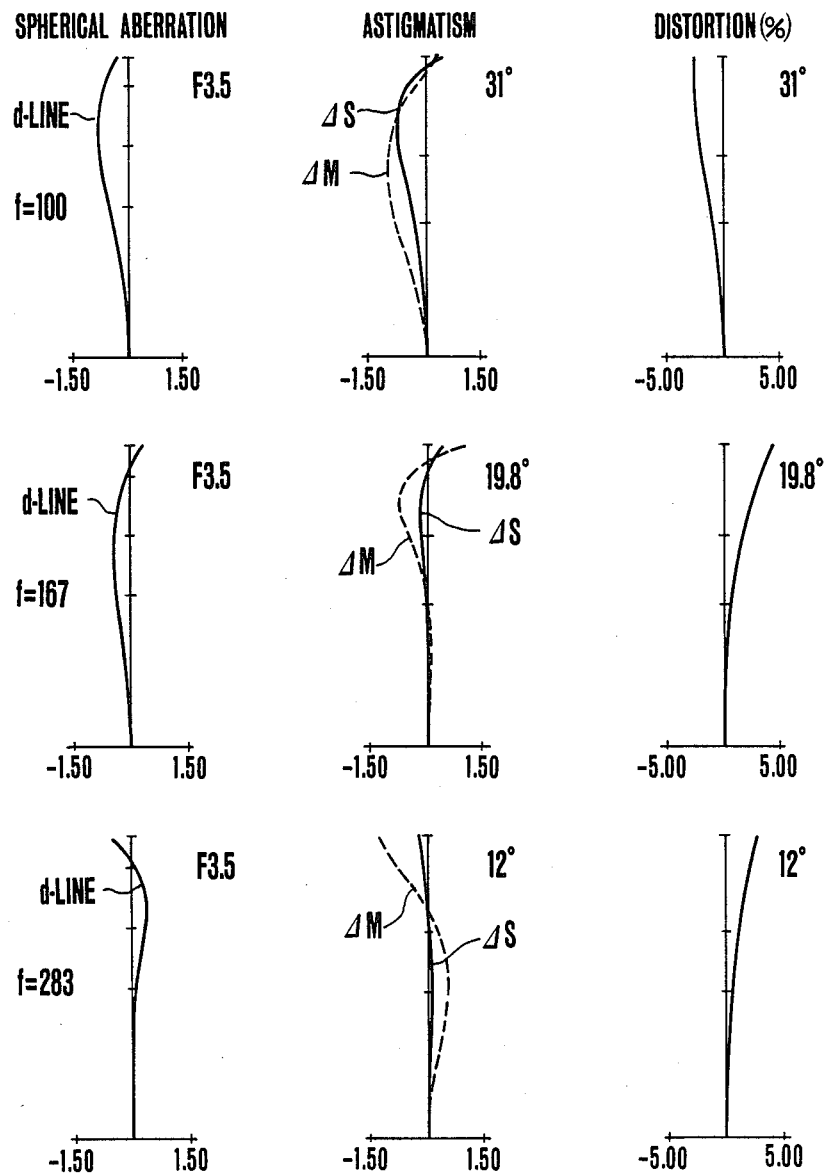

FIG. 5 is a longitudinal section view illustrating another specific zoom lens of the invention, and FIG. 6 shows its aberrations. The symbols in these figures have the same meanings as in the foregoing examples. The aberration curves are of the spherical aberration, astigmatism and distortions at the focal lengths of f=100, 167 and 283 mm.

The zoom lens comprises, from front to rear, a positive first lens unit A which axially moves with zooming to contribute to variation of the image magnification, a negative second lens unit B which is held stationary during zooming, a positive third lens unit C which axially moves with zooming to contribute to a variation of the image magnification and also to compensate for the image shift, and a positive fourth lens unit D which remains stationary during zooming. The negative second lens unit B is constructed with a first radial gradient-index lens having surfaces $R_6$ and $R_7$ and a second radial gradient-index lens having surfaces $R_8$ and $R_9$. Since, in this zoom lens, the negative second lens unit which is most sensitive to decentering is held stationary, it becomes possible to improve the assembly accuracy.

The above-described two gradient-index lenses, unlike the usual lens, have diverging actions at the interiors thereof, providing a negative transition power. Letting the refractive power of the negative second lens unit be denoted by $\phi_{II}$ and the sum of the thicknesses of the gradient-index lenses by D, since, according to the inequality of condition (2), $\phi_{II} \cdot N_1 < 0$, that is, $\phi_{II} < 0$, for the gradient-index lenses are made with refractive index gradients of $N_1 > 0$, they produce a power $\phi = -2N_1 D$ owing to the term of gradient. This implies that the negative power of the lens unit B is partly borne by the term of gradient of the gradient-index lenses. Whilst the prior art would necessitate four to five lens elements, it is in the zoom lens of FIG. 5 that only two lens elements suffice for constituting the negative second lens unit B.

For example, the first gradient-index lens $R_6$, $R_7$, has its rear surface $R_7$ made of a stronger concave curvature. This concave surface $R_7$ in combination with $N_1 > 0$ produce over-corrected third-order spherical aberration in terms of refraction in the telephoto positions.

On this account, the direction in which the spherical aberration in terms of gradient is produced should be made opposite to that of the spherical aberration in terms of refraction so that a balance can be taken. Since the rear surface of the first gradient-index lens is of stronger curvature than the front surface, because it is concave or $K = -1$, when the inequality of condition (3) is satisfied by making the gradient of refractive index with $N_2 < 0$, the spherical aberration in terms of gradient can be produced as opposed to that in terms of refraction to permit the balance to be obtained.

Therefore, the term of refraction for third-order spherical aberration, the term of gradient for third-order spherical aberration and the term of refraction for fifth-order spherical aberration allow the spherical aberrations to be balanced out, thus making it possible to correct the spherical aberration for a higher grade of imagery as the coma and astigmatism also can be well corrected in a similar manner.

The zoom lens of FIG. 5 can be constructed in accordance with the numerical data given in Tables 3-1 to 3-3 below.

TABLE 3-1 f = 100–283 mm   FNO = 3.5–4.5   2ω = 62°–24°

| Radius of curvature | Axial thickness or air separation | Refractive index | Abbe number |
|---|---|---|---|
| R 1 = 407.450 | D 1 = 6.94 | N 1 = 1.80518 | ν 1 = 25.4 |
| R 2 = 137.500 | D 2 = 25.00 | N 2 = 1.60311 | ν 2 = 60.7 |
| R 3 = −1037.545 | D 3 = 0.33 | | |
| R 4 = 127.463 | D 4 = 16.39 | N 3 = 1.69680 | ν 3 = 55.5 |
| R 5 = 614.861 | D 5 = Variable | | |
| R 6 = 468.216 | D 6 = 15.25 | N 4 (h) | |
| R 7 = 39.286 | D 7 = 13.44 | | |
| R 8 = 967.214 | D 8 = 22.92 | N 5 (h) | |
| R 9 = −669.488 | D 9 = Variable | | |
| R 10 = 0. | D 10 = 2.78 | | |
| R 11 = 217.164 | D 11 = 8.89 | N 6 = 1.77250 | ν 6 = 49.6 |
| R 12 = −223.324 | D 12 = 1.06 | | |
| R 13 = 62.499 | D 13 = 7.50 | N 7 = 1.59551 | ν 7 = 39.2 |
| R 14 = 127.754 | D 14 = 10.39 | | |
| R 15 = 53.560 | D 15 = 15.86 | N 8 = 1.51742 | ν 8 = 52.4 |
| R 16 = −410.952 | D 16 = 12.36 | N 9 = 1.84666 | ν 9 = 23.9 |
| R 17 = 40.082 | D 17 = 10.22 | | |
| R 18 = 256.491 | D 18 = 8.33 | N 10 = 1.67003 | ν 10 = 47.3 |
| R 19 = −127.251 | D 19 = Variable | | |
| R 20 = 0. | D 20 = Variable | | |
| R 21 = −113.395 | D 21 = 3.33 | N 11 = 1.77250 | ν 11 = 49.6 |
| R 22 = 227.778 | D 22 = 8.06 | N 12 = 1.51742 | ν 12 = 52.4 |
| R 23 = −426.515 | D 23 = 6.92 | | ν 13 = 58.2 |
| R 24 = 392.060 | D 24 = 15.00 | N 13 = 1.62279 | |
| R 25 = −103.840 | | | |

TABLE 3-2

| | f | | |
|---|---|---|---|
| Di | 100 | 167 | 283 |
| D 5 | 4.06 | 33.33 | 56.32 |
| D 9 | 48.63 | 27.00 | 3.14 |
| D 19 | 3.16 | 14.45 | 18.09 |
| D 20 | 11.11 | 21.44 | 41.67 |

TABLE 3-3

| Ni (h) | N₀ | N₁ | N₂ | N₃ | N₄ |
|---|---|---|---|---|---|
| N 4 (h) | 1.58646 | 2.395 × 10⁻⁴ | −9.34648 × 10⁻⁸ | 5.07906 × 10⁻¹¹ | −1.16755 × 10⁻¹⁴ |
| N 5 (h) | 1.85000 | 1.47898 × 10⁻⁵ | −6.09657 × 10⁻⁸ | −1.52336 × 10⁻¹¹ | −1.97975 × 10⁻¹⁴ |

Figure 7:
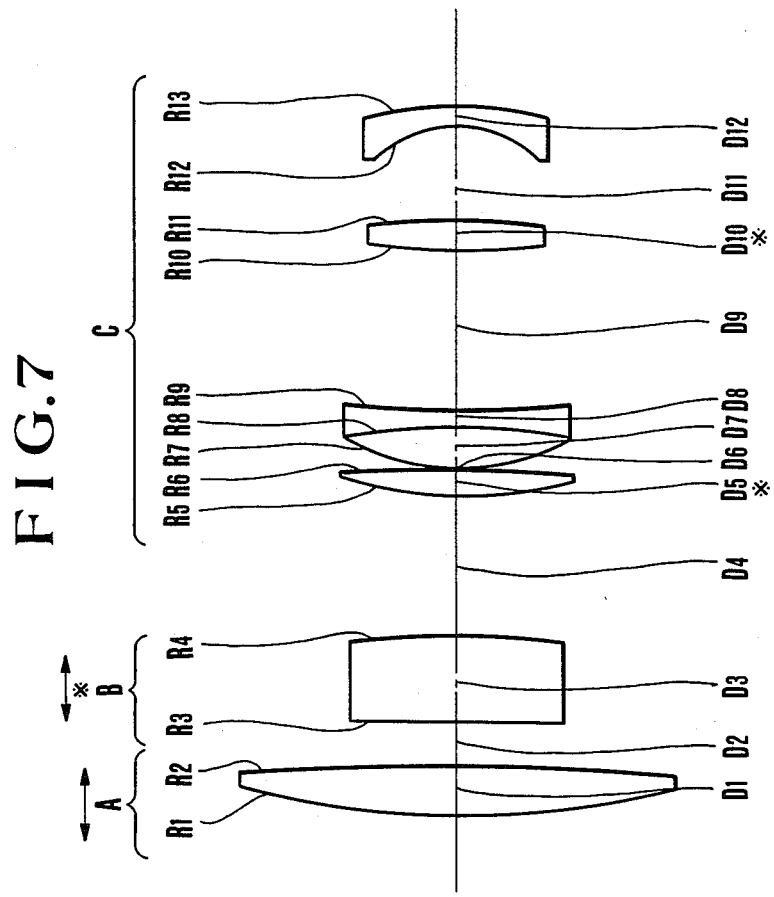

A third example of the specific zoom lens of the invention is illustrated in FIG. 7, and its spherical aberration, astigmatism and distortion are shown in different focal length positions of f=100, 170 and 278 mm.

This zoom lens comprises, from front to rear, a positive first lens unit A which axially moves with zooming, a negative second lens unit B which axially moves with zooming to contribute to variation of the image magnification, and positive third lens unit C which remains stationary during zooming. The positive first lens unit A consists of a radial gradient-index lens having surfaces $R_1$ and $R_2$. The negative second lens unit B consists of a radial gradient-index lens having surfaces $R_3$ and $R_4$ front part of the third lens unit C includes a radial gradient lens of bi-convex form having surfaces $R_5$ and $R_6$ at the frontmost position, followed rearwardly after a very short spacing by an axial gradient-index lens of bi-convex form having surfaces $R_7$ and $R_8$, and a rear part includes a radial gradient-index lens of convex form having surfaces $R_{10}$ and $R_{11}$.

When the positive first lens unit is constructed in the form of a convex lens, and is made with such a gradient of refractive index that a positive transition power is produced as in the zoom lens of the invention, an advantage of correcting spherical aberration in the telephoto positions is produced. And, because other various aberrations can be well corrected, it has been made possible that only one lens element having the gradient of refractive index suffices for contructing the positive first lens unit A.

Also, the radial gradient-index lens having the negative transition power in the negative second lens unit B, because the negative transition power of the interior thereof can partly bear the power of the lens unit B, enables the curvature of the surfaces of the lens to be weakened with an advantage of correcting spherical aberration and Petzval sum.

For example, if the power arrangement is the same, the negative lens unit B which would otherwise be made of homogeneous material only would produce a Petzval sum of $-1.45$ to $-1.6$ referred to the normalized focal length of the entire system to unity. But, in the zoom lens of the invention, as it is constructed with the radial gradient-index lens, the Petzval sum is reduced to a very small value of $-1.06$.

Thus, the adoption of the gradient-index lens as the second lens unit B enables the Petzval sum to be suppressed. This permits the telephoto ratio of the relay lens, that is, the positive third lens unit C to be minimized with an advantage of shortening the optical total length of the entire system.

The third lens unit C is divided into the front and rear parts spaced apart by a longest distance $D_9$ in that lens unit. As the frontmost lens in the front part use is made of a gradient-index lens of bi-convex form. At the same time, as the frontmost lens in the rear part also, use is made of a gradient-index lens which is also of bi-convex form. The first-named and second-named gradient-index lenses have positive and negative transition powers respectively, and their gradients of refractive index are formed so as to satisfy the inequalities (2) and (3). By using such a construction and arrangement, the spherical aberration and coma of the front part and the spherical aberration, curvature of field and distortion of the rear part which would usually by deteriorated when the powers of the front and rear parts are strengthened in order to achieve a shortening of the entire system, are made possible to correct well.

Next explanation is given to how such advantages are produced by the adoption of the gradient-index lens as the positive first lens unit A.

The above-described gradient-index lens, unlike the usual lens of homogeneous medium, has a converging action even at its medium, getting a positive transition power. Letting the refractive power of the positive first lens unit A be denoted by $\phi_I$ and the thickness of the gradient-index lens by D, since, according to the inequality of condition (2), or $\phi_I \cdot N_1 < 0$, as $\phi_I > 0$, the gradient of refractive index is made with $N_1 < 0$, because such a gradient-index lens produces a power $\phi$ in terms of gradient given by the expression $\phi = -2N_1D$, it should be understood that the positive power of the lens unit A is partly borne by the term of gradient of that gradient-index lens.

As the curvatures of both convex surfaces of the positive first lens unit A, therefore, become weaker, smaller spherical aberrations are produced. A good result of the other aberrations, for example, coma and astigmatism, can also be attained. These facts enable the positive first lens unit A to be constructed with only one gradient-index lens.

Since both surfaces of the gradient-index lens constituting the positive first lens unit A are convex, and $N_1 < 0$, the third-order spherical aberration in terms of refraction is over-corrected in the telephoto positions. Further since, as both surfaces of the gradient-index lens in the positive first lens unit A are convex, $K = +1$, for, as the inequality of condition (3) is satisfied, the gradient of refractive index is made with $N_2 < 0$, the spherical aberration in terms of gradient is produced as opposed to that in terms of refraction, thus permitting a balance of them to be taken.

Further, with the gradient of refractive index of $N_2 < 0$, the fifth-order spherical aberration in terms of refraction is over-corrected. Thus, the third-order spherical aberrations in terms of refraction and gradient and the fifth order spherical aberration in terms of refraction are balanced out with one another to achieve a higher degree of correction of spherical aberration. In a similar manner, higher degrees of correction of coma and astigmatism can be obtained.

Next, concerning the advantages arising from the use of a gradient-index lens as the negative second lens unit B, letting the refractive power of the negative second lens unit B be denoted by $\phi_{II}$ and the thickness of the aforesaid gradient-index lens by D, since, according to the inequality of condition (2), or $\phi_{II} \cdot N_1 < 0$, as $\phi_{II} < 0$, the gradient of refractive index is made with $N_1 > 0$, for the aforesaid gradient-index lens produces a power $\phi$ owing to the gradient given by the expression $\phi = -2N_1D$ the negative power of the lens unit B is partly borne by the term of gradient. Therefore, it is in the zoom lens of the invention that the negative second lens unit can be constructed by using one lens element whose both surfaces are of weaker curvature.

Since both surfaces of the gradient-index lens constituting the negative second lens unit B are convex, for a refractive index pattern with $N_1 > 0$ appears at that surface, the third-order spherical aberration in terms of refraction is under-corrected in the telephoto positions. Further since, as both surfaces of the aforesaid gradient-index lens are convex, $K = +1$, because the gradient of refractive index is made with $N_2 > 0$, according to the inequality of condition (3), the spherical aberrations in terms of gradient and refraction are produced as opposed to each other to permit a balance to be taken.

Further, with the gradient of refractive index of $N_2 > 0$, the fifth-order spherical aberration in terms of refraction is under-corrected. Therefore, the third-order spherical aberrations in terms of gradient and refraction and the fifth-order spherical aberration in terms of refraction are balanced out with one another to achieve a higher degree of correction of spherical aberration. In a similar manner, higher degrees of corection of coma and astigmatism can be achieved.

Usually, the negative second lens unit B is constructed with three lens elements, and the spherical aberration is corrected by the cemented surface of them. In the present invention, on the other hand, despite the number of constituent lens elements is only one, the various aberrations can be corrected.

Next, concerning the advantages arising the incorporation of the gradient-index lens into the front part of the positive third lens unit C, letting the refractive power of the front part of the third lens unit C be denoted by $\phi_{III-1}$, and the thickness of the radial gradient-index lens by $D_1$, since, as $\phi_{III-1} > 0$, $N_1 < 0$, or since, as the inequality of condition (2) is satisfied, the gradient of refractive index is made with $N_1 < 0$, for that gradient-index lens produces a transition power $\phi = -2N_1D_1$ which is positive, the positive power of the front part is partly borne by the transition power of the gradient-index lens. Also since, as both surfaces of that gradient-index lens are convex, $K = +1$, the gradient of refractive index is made also according to the inequality of condition (3).

Therefore, the spherical aberration can be well corrected, and other aberrations for example, coma and astigmatism, can also be well corrected. Therefore, the total length can be shortened by strengthening the power of the front part. That is, regarding the correction of spherical aberration, for the gradient of refractive index is made of $N_1 < 0$, the third-order spherical aberration in terms of refraction is over-corrected in the telephoto positions, and the spherical aberration in terms of gradient is produced as opposed to that in terms of refraction to permit a balance to be taken. Further since the gradient of refractive index is made of $N_2 < 0$, the fifth-order spherical aberration in terms of refraction is over-corrected. The third-order spherical aberrations in terms of refraction and gradient and the fifth-order spherical aberration in terms of refraction are delicately balanced out with one another to permit a higher degree of correction of spherical aberration to be obtained. In a similar manner, higher degrees of correction of coma and astigmatism can also be obtained.

Next, concerning the advantages arising from the incorporation of the gradient-index lens in the rear part of the positive third lens unit C, letting the refractive power of the rear part be denoted by $\phi_{III-2}$, and the thickness of the gradient-index lens by $D_2$, since, according to the inequality of condition (2), as $\phi_{III-2} < 0$, $N_1 > 0$, for the gradient of refractive index is made with $N_1 > 0$, that gradient-index lens produces a negative transition power $\phi = -2N_1D_2$ which is to partly bear the power of the rear part. Therefore, even if the negative refractive power of the rear part of the positive third lens unit C is strengthened, the various aberrations can be well corrected to permit the total length to be shortened. Since both refracting surfaces of the gradient-index lens, similarly to the front part, are convex, because $N_1 > 0$, the third-order spherical aberration in terms of refraction is under-corrected. Also since $K = +1$, for the inequality of condition (3) is satisfied, the spherical aberration in terms of gradient is produced as opposed to that in terms of refraction to permit a balance to be taken.

Further since the gradient of refractive index is made of $N_2 > 0$, the fifth-order spherical aberration in terms of refraction is under-corrected. Similarly to the gradient-index lens in the front part, the third-order spherical aberration and the fifth-order spherical aberration in terms of refraction are balanced out to achieve a higher degree of correction of spherical aberration. Also, higher degrees of correction of coma, astigmatism, and distortion can be obtained.

It will be appreciated that a great reduction of the size of the entire system can be achieved by incorporating the gradient-index leses into the last lens unit while maintaining a good stability of aberration correction throughout the entire system when the inequalities of condition (2) and (3) are satisfied.

Though this specific example has been described in connection with the last or positive third lens unit C which is held stationary during zooming, it is to be understood that the present invention is applicable to another zoom type in which the last or third lens unit axially moves with zooming, while preserving the above-described advantages to obtain a compact zoom lens.

The fourth example of the specific zoom lens can be constructed in accordance with the numerical data given in Tables 4-1 to 4-3. As the fourth lens counting from front in the zoom lens is a gradient-index lens of the axial type, the gradient of refractive index $N_4(x)$ can be expressed by the following equation in terms of the distance x measured from the front vertex toward the rear in the direction parallel to the optical axis.

$$N4(x) = N_0 + N_1x + N_2x^2 + N_3x^3 + N_4x^4 + \ldots$$

where $N_0$ is the refractive index at the front vertex, and $N_1, N_2, N_3, \ldots$ are coefficients similarly to the radial type.

TABLE 4-1

| | f = 100 -249 mm | FNO = 4.5 | $2\omega$ = 15.4°-6.3° | |
|---|---|---|---|---|
| Radius of curvature | Axial thickness or air separation | Refractive index | | Abbe number |
| R 1 = 152.141 | D 1 = 6.45 | N 1 = N 1 (h) | | |
| R 2 = −364.417 | D 2 = Variable | | | |
| R 3 = 1791.055 | D 3 = 11.89 | N 2 = N 2 (h) | | |
| R 4 = −232.978 | D 4 = Variable | | | |
| R 5 = 58.465 | D 5 = 3.11 | N 3 = N 3 (h) | | |
| R 6 = −310.150 | D 6 = 0.13 | | | |
| R 7 = 33.218 | D 7 = 5.94 | N 4 = N 4 (x) | | |
| R 8 = −105.627 | D 8 = 1.92 | N 5 = 1.76182 | | $\nu$ 5 = 26.7 |
| R 9 = 144.548 | D 9 = 22.45 | | | |
| R 10 = 78.968 | D 10 = 3.74 | N 6 = N 6 (h) | | |
| R 11 = −129.162 | D 11 = 13.14 | | | |
| R 12 = −18.251 | D 12 = 2.55 | | | |
| R 13 = −63.480 | | N 7 = 1.51633 | | $\nu$ 7 = 65.0 |

TABLE 4-2

| | f | | |
|---|---|---|---|
| Di | 100 | 178 | 249 |
| D 2 | 6.1093 | 60.9511 | 80.5207 |
| D 4 | 19.4808 | 10.5103 | 2.5538 |

TABLE 4-3

| | $\lambda$ | $N_0$ | $N_1$ | $N_2$ | $N_3$ | $N_4$ |
|---|---|---|---|---|---|---|
| N 1 (h) | d | 1.60311 | $-1.03484 \times 10^{-5}$ | $-1.43773 \times 10^{-9}$ | $-3.77260 \times 10^{-13}$ | $-3.27796 \times 10^{-15}$ |
| | g | 1.61539 | $-1.46124 \times 10^{-6}$ | $7.45671 \times 10^{-9}$ | $-7.54785 \times 10^{-12}$ | $-1.90601 \times 10^{-14}$ |
| N 2 (h) | d | 1.51633 | $1.18942 \times 10^{-3}$ | $2.19747 \times 10^{-7}$ | $1.65968 \times 10^{-10}$ | $-2.56728 \times 10^{-13}$ |
| | g | 1.52621 | $1.19257 \times 10^{-3}$ | $2.09285 \times 10^{-7}$ | $1.45862 \times 10^{-10}$ | $-2.57532 \times 10^{-13}$ |
| N 3 (h) | d | 1.60311 | $-1.49443 \times 10^{-4}$ | $1.68071 \times 10^{-8}$ | $2.21414 \times 10^{-11}$ | $-7.55521 \times 10^{-14}$ |
| | g | 1.61539 | $-1.27794 \times 10^{-4}$ | $4.27907 \times 10^{-8}$ | $-2.69545 \times 10^{-11}$ | $-2.73292 \times 10^{-13}$ |
| N 4 (x) | d | 1.60311 | $5.07740 \times 10^{-3}$ | $-3.02946 \times 10^{-4}$ | $2.20784 \times 10^{-5}$ | |
| | g | 1.61539 | $3.10865 \times 10^{-3}$ | $-3.06770 \times 10^{-4}$ | $-3.15046 \times 10^{-6}$ | |

TABLE 4-3-continued

| | λ | $N_0$ | $N_1$ | $N_2$ | $N_3$ | $N_4$ |
|---|---|---|---|---|---|---|
| N 6 (h) | d | 1.51633 | $5.65029 \times 10^{-4}$ | $1.95324 \times 10^{-6}$ | $3.48922 \times 10^{-9}$ | $2.96608 \times 10^{-11}$ |
| | g | 1.52621 | $5.35259 \times 10^{-4}$ | $1.88101 \times 10^{-6}$ | $1.63007 \times 10^{-9}$ | $3.22708 \times 10^{-11}$ |

Figure 9:
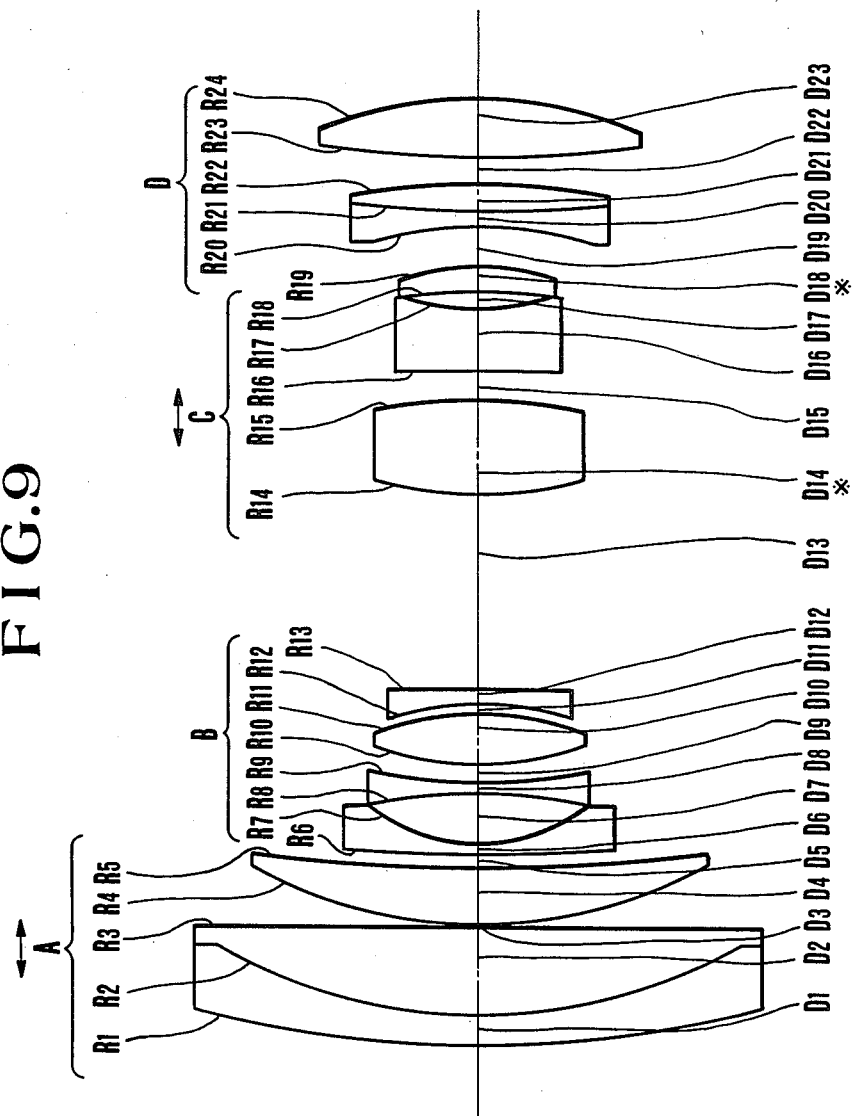

A fifth example of the specific zoom lens of the invention is illustrated in FIG. 9 and its spherical aberration, astigmatism and distortion in the focal length positions of f=100, 167 and 283 mm are shown in FIG. 10.

This zoom lens comprises, from front to rear, a positive first lens unit A which axially moves with zooming to contribute to variation of the image magnification, a negative second lens unit B which is held stationary during zooming, a positive third lens unit C which axially moves with zooming to contribute to a variation of the image magnification and to compensate for the image shift, and a positive fourth lens unit D which remains stationary during zooming. The third lens unit C comprises, front from to rear, positive, negative and positive lenses, of which the first positive is a radial gradient-index lens having a positive transition power with the surfaces $R_{14}$ and $R_{15}$, and the second positive is a radial gradient-index lens having a negative transition power with the surfaces $R_{18}$ and $R_{19}$. Because, in this zoom lens, the position of the negative second lens unit B relative to the image plane does not change, this type is suited to facilitate simplification of the structure of the operating mechanism.

The rays of light emerging from the negative second lens unit B are divergent on the positive first lens of the third lens unit C. As the height of incidence of the principal ray is higher than in the other types of zoom lens, under-correction of spherical aberration is liable to result. On this account, use is made of the gradient-index lens so that it is corrected in direction to over-correction. And, since the positive first or gradient-index lens has a positive transition power, for, as the positive power of that lens is so much strengthened, the principal point of the positive third lens unit C is brought to a more forward position, the interval between the principal points of the negative second and positive third lenses can be reduced, contributing to a shortening of the entire system.

Also, as the height of incidence of the oblique pencile on the positive third lens is high, the use of another gradient-index lens as this lens allows for correcting particularly astigmatism.

It has been customary that the positive third lens unit C in this kind of zoom lens is constructed with at least five lens elements. In the invention, on the other hand, only three lens elements suffice, contributing to a compactness of the entire system. Another advantage arising from the reduction of the number of lens elements is that the assembly and the adjusting operation become easier, making it possible to simplify the structure of the operating mechanism.

In more detail, letting the refractive power of the positive third lens unit C be denoted by $\phi_{III}$ and the thickness of the gradient-index lens by D, since, according to the inequality of condition (2), or $\phi_{III} \cdot N_1 < 0$, as $\phi_{III} > 0$, $N_1 < 0$, for the gradient-index lens made of such a gradient of refractive index gets a power $\phi = -2N_1D$ owing to the term of gradient, the positive power of the lens unit C is partly borne by the term of gradient of that gradient-index lens.

With both convex surfaces of the gradient-index lens, for the gradient of refractive index is made of $N_1 < 0$, the third-order spherical aberration in terms of refraction is over-corrected in the telephoto positions. Since, as both surfaces of the gradient-index lens are convex, $K = +1$, for, according to the inequality of condition (3), the gradient of refractive index is further made of $N_2 < 0$, the spherical aberration in terms of the gradient is produced as opposed in direction to that in terms of the refraction, to permit a balance to be taken.

Further, with the gradient of refractive index of $N_2 < 0$, over-correction of the fifth-order spherical aberration in terms of the refraction results. So, the third-order spherical aberration in terms of the refraction, the third-order spherical aberration in terms of the gradient and the fifth-order spherical aberration in terms of the refraction are balanced out to permit a higher correction of spherical aberration to be obtained. In a similar manner, higher degrees of correction of coma and astigmatism can also be obtained.

The zoom lens of FIG. 9 can be constructed in accordance with the numerical data given in Tables 5-1 to 5-3 below.

TABLE 5-1

| f = 100-283 mm  FNO = 3.5-4.7  2ω = 62°-24° | | | |
|---|---|---|---|
| Radius of curvature | Axial thickness or air separation | Refractive index | Abbe number |
| R 1 = 329.775 | D 1 = 6.94 | N 1 = 1.80518 | ν 1 = 25.4 |
| R 2 = 137.307 | D 2 = 25.00 | N 2 = 1.60311 | ν 2 = 60.7 |
| R 3 = −2316.906 | D 3 = 0.33 | | |
| R 4 = 127.715 | D 4 = 16.11 | N 3 = 1.69680 | ν 3 = 55.5 |
| R 5 = 589.863 | D 5 = Variable | | |
| R 6 = 349.552 | D 6 = 3.33 | N 4 = 1.88300 | ν 4 = 40.8 |
| R 7 = 49.444 | D 7 = 13.33 | | |
| R 8 = −147.683 | D 8 = 3.06 | N 5 = 1.88300 | ν 5 = 40.8 |
| R 9 = 179.196 | D 9 = 5.14 | | |
| R 10 = 96.122 | D 10 = 13.33 | N 6 = 1.84666 | ν 6 = 23.9 |
| R 11 = −88.957 | D 11 = 3.71 | | |
| R 12 = −68.016 | D 12 = 3.06 | N 7 = 1.83400 | ν 7 = 37.2 |
| R 13 = −955.505 | D 13 = Variable | | |
| R 14 = 83.717 | D 14 = 26.71 | N 8 = N 8 (h) | |
| R 15 = −156.910 | D 15 = 7.80 | | |
| R 16 = 11044.891 | D 16 = 16.47 | N 9 = 1.84666 | ν 9 = 23.9 |
| R 17 = 56.388 | D 17 = 5.28 | | |
| R 18 = −455.820 | D 18 = 6.94 | N 10 = N 10 (h) | |
| R 19 = −69.670 | D 19 = Variable | | |
| R 20 = −95.749 | D 20 = 3.33 | N 11 = 1.77250 | ν 11 = 49.6 |
| R 21 = 282.765 | D 21 = 8.06 | N 12 = 1.51633 | ν 12 = 64.1 |
| R 22 = −169.580 | D 22 = 6.53 | | |
| R 23 = 227.054 | D 23 = 15.00 | N 13 = 1.51742 | ν 13 = 52.4 |
| R 24 = −115.070 | | | |

TABLE 5-2

| | f | | |
|---|---|---|---|
| Di | 100 | 167 | 283 |
| D 5 | 2.92 | 32.18 | 55.18 |
| D 13 | 52.25 | 30.63 | 6.77 |
| D 19 | 11.11 | 32.74 | 56.59 |

TABLE 5-3

| Ni (h) | λ | $N_0$ | $N_1$ | $N_2$ | $N_3$ | $N_4$ |
|---|---|---|---|---|---|---|
| N 8 (h) | d | 1.60342 | $-1.43316 \times 10^{-4}$ | $-2.49536 \times 10^{-8}$ | $-8.04703 \times 10^{-12}$ | $-6.64964 \times 10^{-15}$ |
|  | g | 1.62382 | $-1.43595 \times 10^{-4}$ | $-2.82066 \times 10^{-8}$ | $5.33417 \times 10^{-12}$ | $-1.80972 \times 10^{-14}$ |
| N 10 (xh) | d | 1.50137 | $2.16886 \times 10^{-5}$ | $-3.60780 \times 10^{-9}$ | $7.16738 \times 10^{-12}$ | $-2.03457 \times 10^{-14}$ |
|  | g | 1.51250 | $1.85615 \times 10^{-5}$ | $6.03319 \times 10^{-8}$ | $-3.72674 \times 10^{-10}$ | $6.14045 \times 10^{-13}$ |

Figure 11:
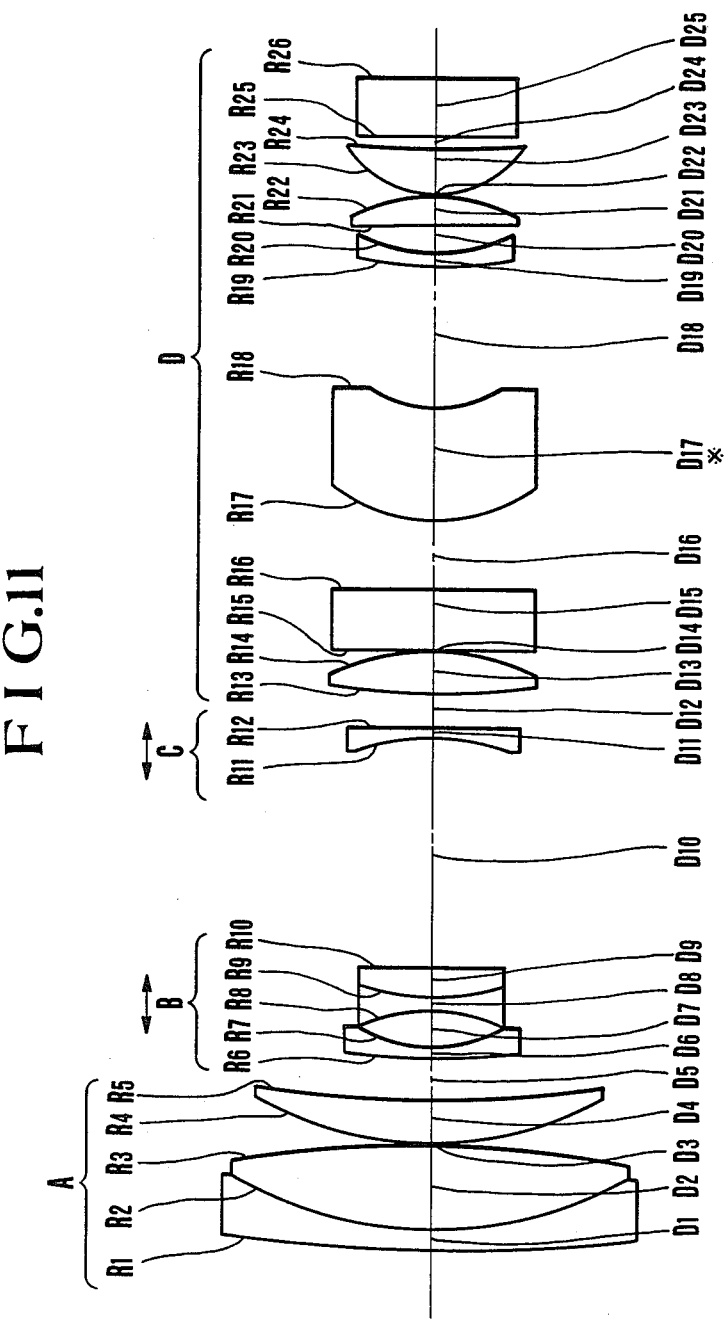

A sixth example of the specific zoom lens of the invention is illustrated in FIG. 11, whose spherical aberration, astigmatism and distortion in the focal length positions of f=100, 280 and 570 mm are shown in FIG. 12.

This zoom lens comprises, from front to rear, a positive first lens unit A which is held stationary during zooming, a negative second lens unit B which axially moves with zooming to contribute to variation of the image magnification, a negative third lens unit C which axially moves with zooming to compensate for the image shift, and a positive fourth lens unit D which is held stationary during zooming. As this zoom lens is adapted to be used with an image pickup device, the fourth lens unit D is usually included with a positive lens for making afocal the arriving rays of divergence in passing therethrough at the front most position and a prism (not shown) as a beam splitter for the finder, and, in many cases, also with a diaphragm. Also, since the image plane is immediately preceded by a low pass filter, a stripe filter and a face plate, the rays emerging from the positive fourth lens unit D are almost telecentric.

In the invention, a lens group of positive power which is usually constructed with three or four lens elements just behind the diaphragm is replaced by one gradient-index lens having surfaces $R_{17}$ and $R_{18}$. For the medium of the gradient-index lens as having a positive transition power bears part of the overall positive power of that lens, the curvature of its surfaces can be weakened to suppress aberrations to minimum. Also, the surfaces $R_{17}$ and $R_{18}$ each have lower refractive indices from the paraxial region toward the margin. So, the more marginal the incident ray, the smaller it refracts as compared with the lens of homogeneous material, and the smaller the spherical aberration and coma produced become. Further, for $N_2>0$, the excessively undercorrected spherical aberration by the presence of the refractive index pattern over the surface $R_{18}$ can be corrected when the rays pass through the interior thereof.

In such a manner, the aberrations can be corrected. Whilst the conventional relay section has had many troubles due to the optical misalignment, the positive fourth lens unit D as the relay section can be constructed with only one lens element for the positive lens group just behind the diaphragm, thereby giving an advantage of facilitating the assembly and the adjusting operation. Also, as the residual aberrations of the front part of the relay section become small, the curvatures of the surfaces of the lens elements constituting the rear part of the relay section can be weakened. So, the assembly and adjusting operation become easier.

Concerning the advantages produced by incorporating the gradient-index lens into the positive fourth lens unit D, a more detailed explanation is given below.

Since the gradient-index lens with the surfaces $R_{17}$ and $R_{18}$ satisfies the inequality of condition (2), or $\phi_G \cdot N_1 < 0$, the power of the positive fourth lens unit D is partly borne by the term of gradient of that gradient-index lens. Therefore, the surface curvature of each of the lens elements constituting the fourth lens unit D can be weakened, thereby it being made possible to decrease the aberrations. Another advantage is that when the minimum acceptable edge thickness or marginal separation is taken, the axial air spacing can be minimized, thereby it being made possible to shorten the fourth lens unit D and therefore to achieve an advance in the compactness of the entire system.

Further since the inequality of condition (3) or $K \cdot \phi_G \cdot N_2 < 0$, is simultaneously satisfied, the direction of correction of aberrations by the surface of stronger curvature is made opposed to that of correction of those aberrations by the gradient of refractive index. This implies that the convex gradient-index lens though being only one is equivalent in the aberration correcting effect to several number of convex and concave lenses in combination. Thus, the spherical aberration, coma and astigmatism can be well corrected.

The sixth example of the zoom lens of the invention can be constructed in accordance with the numerical data given in Tables 6-1 to 6-3 below.

TABLE 6-1 f = 100–570 mm  FNO = 1.22–1.39  2ω = 49°–9°

| Radius of curvature | Axial thickness or air separation | Refractive index | Abbe number |
|---|---|---|---|
| R 1 = 1656.780 | D 1 = 22.73 | N 1 = 1.80518 | ν 1 = 25.4 |
| R 2 = 460.895 | D 2 = 92.04 | N 2 = 1.60311 | ν 2 = 60.7 |
| R 3 = −1206.452 | D 3 = 1.70 |  |  |
| R 4 = 355.491 | D 4 = 51.14 | N 3 = 1.69680 | ν 3 = 55.5 |
| R 5 = 1154.930 | D 5 = Variable |  |  |
| R 6 = 971.149 | D 6 = 11.36 | N 4 = 1.77250 | ν 4 = 49.6 |
| R 7 = 155.806 | D 7 = 43.84 |  |  |
| R 8 = −202.438 | D 8 = 11.36 | N 5 = 1.73500 | ν 5 = 49.8 |
| R 9 = 213.710 | D 9 = 36.36 | N 6 = 1.84666 | ν 6 = 23.9 |
| R 10 = −2717.151 | D 10 = Variable |  |  |
| R 11 = −276.943 | D 11 = 11.36 | N 7 = 1.69680 | ν 7 = 55.5 |
| R 12 = 15112.844 | D 12 = Variable |  |  |
| R 13 = 621.683 | D 13 = 47.73 | N 8 = 1.71300 | ν 8 = 53.8 |
| R 14 = −310.849 | D 14 = 2.27 |  |  |
| R 15 = 0.0 | D 15 = 68.18 | N 9 = 1.51633 | ν 9 = 64.1 |
| R 16 = 0.0 | D 16 = 77.84 |  |  |
| R 17 = 188.081 | D 17 = 129.89 | N 10 (h) |  |
| R 18 = 130.653 | D 18 = 160.23 |  |  |
| R 19 = 436.232 | D 19 = 12.50 | N 11 = 1.80518 | ν 11 = 25.4 |
| R 20 = 191.471 | D 20 = 30.68 |  |  |
| R 21 = 1800.375 | D 21 = 34.09 | N 12 = 1.51633 | ν 12 = 64.1 |
| R 22 = −204.201 | D 22 = 1.14 |  |  |
| R 23 = 125.316 | D 23 = 51.14 | N 13 = 1.72000 | ν 13 = 50.2 |
| R 24 = 1653.314 | D 24 = 14.77 |  |  |
| R 25 = 0.0 | D 25 = 62.50 | N 14 = 1.51633 | ν 14 = 64.1 |
| R 26 = 0.0 |  |  |  |

TABLE 6-2

| Di | f |  |  |
|---|---|---|---|
|  | 100 | 280 | 570 |
| D 5 | 21.50 | 196.44 | 269.14 |
| D 10 | 257.50 | 60.72 | 29.30 |
| D 12 | 37.91 | 59.75 | 18.47 |

TABLE 6-3

| Ni (h) | λ | $N_0$ | $N_1$ | $N_2$ | $N_3$ | $N_4$ | $N_5$ |
|---|---|---|---|---|---|---|---|
| N 10 (h) | d | 1.8457 | $-5.76408 \times 10^{-6}$ | $6.72888 \times 10^{-11}$ | $1.83029 \times 10^{-15}$ | $6.51016 \times 10^{-20}$ | $6.69015 \times 10^{-24}$ |
|  | g | 1.86557 | $-5.45905 \times 10^{-6}$ | $8.8922 \times 10^{-11}$ | $8.24188 \times 10^{-16}$ | $1.50515 \times 10^{-20}$ | $1.51127 \times 10^{-23}$ |

It is to be understood from the above-described specific embodiments of the invention that when a gradient-index lens that satisfies the inequalities (2) and (3) is incorporated into a desired one or ones of the lens units, for the lens unit is of positive power, the gradient-index lens has an almost equivalent effect to that of a lens system of two positive lenses and one negative lens which are of homogeneous medium, and for the lens unit is of negative power, it has an almost equivalent effect to that of a lens system of two negative lenses and one positive lens.

Therefore, the above-described advantages on the aberration correction can be obtained when at least one of the plurality of lens units of the zoom lens is included with at least one gradient-index lens provided that the above-stated conditions (2) and (3) are satisfied. Further, the necessary number of constituent lens elements in that lens unit can be remarkably reduced. It is, therefore, obvious that as the number of gradient-index lenses used and the number of lens units employing those gradient-index lenses increase, a further improvement of the performance and compactness of the zoom lens can be achieved.

What is claimed is:

1. A variable focal length objective comprising a plurality of lens units of which the first from the object side is a positive lens unit, the second from the object side is a negative lens unit, and in which when varying the image magnification, the separation between said first and said second lens units varies, wherein at least one of the plurality of lens units has at least one gradient-index lens having a gradient of refractive index defined by the following equation:

$$N(h) = N_0 + N_1 h^2 + N_2 h^4 + \ldots$$

wherein h is the height from the optical axis; $N_0$ is the refractive index on the optical axis, and $N_1, N_2, \ldots$ are constants, and wherein when the refractive power of said at least one lens unit is denoted by $\phi_G$, and when the sign of the strongest curvature surface of said gradient-index lens is denoted by K such that $K = +1$ when said strongest curvature surface is convex, and $K = -1$ when said strongest curvature surface is concave, the following conditions are satisfied:

$$\phi_G \cdot N_1 < 0$$

$$K \cdot \phi_G \cdot N_2 < 0.$$

2. A variable focal length objective according to claim 1, wherein said gradient-index lens is provided in said first lens unit.

3. A variable focal length objective according to claim 1, wherein said gradient-index lens is arranged in at least a lens unit which moves to effect variation of the image magnification.

4. A variable focal length objective according to claim 1, wherein of said plurality of lens units, there is a last lens unit that is furthest from the object side and comprises a front part and a rear part that are separated from each other by a distance that is larger than the distance separating a front and a rear part of any other of the plurality of lens units, and wherein at least one of said front and said rear parts of said last lens unit has at least one gradient-index lens that satisfies said equation and conditions.

* * * * *

UNITED STATES PATENT AND TRADEMARK OFFICE
CERTIFICATE OF CORRECTION

PATENT NO. : 4,842,386

DATED : June 27, 1989

INVENTOR(S) : Nozomu Kitagishi, et al

It is certified that error appears in the above-identified patent and that said Letters Patent is hereby corrected as shown below:

At column 2, line 7, "pencile," should read --pencil,--;

At column 2, line 27, "Odd numbered" should read --Odd-numbered--; and

At column 2, line 30, "Even numbered" should read --Even-numbered--.

At column 3, line 46, "sphare" should read --sphere--.

At column 4, formula 18, "$[\ 8N_2 h\bar{h}^3 = \frac{2N_1 \bar{h}\bar{a}}{N_o^2}$"

should read --$[\ 8N_2 h\bar{h}^3 + \frac{2N_1 \bar{h}\bar{a}}{N_o^2}$--

At column 5, line 51, "distrubution" should read --distribution--.

UNITED STATES PATENT AND TRADEMARK OFFICE
CERTIFICATE OF CORRECTION

PATENT NO. : 4,842,386

DATED : June 27, 1989

INVENTOR(S) : NOZOMU KITAGISHI ET AL

It is certified that error appears in the above-identified patent and that said Letters Patent is hereby corrected as shown below:

At column 12, line 63, "$R_3$ and $R_4$" should read --$R_3$ and $R_4$.--; and

At column 12, line 64, "front" should read --A front--.

At column 14, line 58, "corection" should read --correction--

At column 15, line 37, "$\phi_{III-2}$," should read --$\phi_{III-2}$.--.

Signed and Sealed this

Nineteenth Day of June, 1990

Attest:

HARRY F. MANBECK, JR.

*Attesting Officer*     *Commissioner of Patents and Trademarks*